(12) United States Patent
Nield et al.

(10) Patent No.: US 10,884,797 B2
(45) Date of Patent: Jan. 5, 2021

(54) SCHEDULING TASKS USING TARGETED PIPELINES

(71) Applicant: Imagination Technologies Limited, Kings Langley (GB)

(72) Inventors: Simon Nield, Kings Langley (GB); Yoong-Chert Foo, Kings Langley (GB); Adam de Grasse, Kings Langley (GB); Luca Iuliano, Kings Langley (GB)

(73) Assignee: Imagination Technologies Limited, Kings Langley (GB)

( * ) Notice: Subject to any disclaimer, the term of this patent is extended or adjusted under 35 U.S.C. 154(b) by 113 days.

(21) Appl. No.: 16/011,093

(22) Filed: Jun. 18, 2018

(65) Prior Publication Data

US 2018/0365057 A1    Dec. 20, 2018

(30) Foreign Application Priority Data

Jun. 16, 2017 (GB) .................................. 1709653.8

(51) Int. Cl.
| | |
|---|---|
| *G06F 9/22* | (2006.01) |
| *G06F 9/48* | (2006.01) |
| *G06F 9/38* | (2018.01) |
| *G06F 7/575* | (2006.01) |
| *G06F 9/30* | (2018.01) |

(52) U.S. Cl.
CPC ............ *G06F 9/4881* (2013.01); *G06F 7/575* (2013.01); *G06F 9/3001* (2013.01); *G06F 9/3016* (2013.01); *G06F 9/3836* (2013.01); *G06F 9/3851* (2013.01); *G06F 9/3867* (2013.01)

(58) Field of Classification Search
CPC ....................................................... G06F 15/00
See application file for complete search history.

(56) References Cited

U.S. PATENT DOCUMENTS

| | | | | |
|---|---|---|---|---|
| 4,707,783 | A * | 11/1987 | Lee ........................ | G06F 9/3885 |
| | | | | 712/214 |
| 6,272,616 | B1 * | 8/2001 | Fernando ............ | G06F 9/30032 |
| | | | | 712/20 |
| 7,100,060 | B2 * | 8/2006 | Cai ........................ | G06F 1/206 |
| | | | | 713/320 |
| 2007/0143581 | A1 | 6/2007 | Mansell | |
| 2008/0074428 | A1 | 3/2008 | Bakalash et al. | |
| 2009/0037916 | A1 | 2/2009 | Morishita et al. | |
| 2013/0155077 | A1 | 6/2013 | Hartog et al. | |
| 2015/0220347 | A1 | 8/2015 | Glossner et al. | |

* cited by examiner

*Primary Examiner* — Cheng Yuan Tseng
(74) *Attorney, Agent, or Firm* — Potomac Law Group, PLLC; Vincent M DeLuca

(57) ABSTRACT

A method of scheduling instructions within a parallel processing unit is described. The method comprises decoding, in an instruction decoder, an instruction in a scheduled task in an active state, and checking, by an instruction controller, if an ALU targeted by the decoded instruction is a primary instruction pipeline. If the targeted ALU is a primary instruction pipeline, a list associated with the primary instruction pipeline is checked to determine whether the scheduled task is already included in the list. If the scheduled task is already included in the list, the decoded instruction is sent to the primary instruction pipeline.

13 Claims, 12 Drawing Sheets

SCHEDULING TASKS USING TARGETED PIPELINES

BACKGROUND

A graphics processing unit (GPU) comprises a highly parallel structure which is designed to efficiently process large amounts of data in parallel. GPUs are typically used for computer graphics (e.g. to render 3D images on a screen), however they may also be used for other operations which benefit from the parallelism they provide.

The embodiments described below are provided by way of example only and are not limiting of implementations which solve any or all of the disadvantages of known GPUs or other parallel processing units.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A method of scheduling instructions within a parallel processing unit is described. The method comprises decoding, in an instruction decoder, an instruction in a scheduled task in an active state, and checking, by an instruction controller, if an ALU targeted by the decoded instruction is a primary instruction pipeline. If the targeted ALU is a primary instruction pipeline, a list associated with the primary instruction pipeline is checked to determine whether the scheduled task is already included in the list. If the scheduled task is already included in the list, the decoded instruction is sent to the primary instruction pipeline.

A first aspect provides a method of scheduling instructions within a parallel processing unit comprising: decoding, in an instruction decoder, an instruction in a scheduled task in an active state; checking, by an instruction controller, if an ALU targeted by the decoded instruction is a primary instruction pipeline; in response to determining that the ALU targeted by the decoded instruction is a primary instruction pipeline, checking a list associated with the primary instruction pipeline to determine whether the scheduled task is already included in the list; and in response to determining that the scheduled task is already included in the list, sending the decoded instruction to the primary instruction pipeline.

A second aspect provides an instruction controller comprising: an input for receiving an instruction in a scheduled in an active state from a scheduler; an instruction decoder arranged to decode the received instruction; a memory element arranged to store a list of scheduled tasks associated with a primary instruction pipeline in a parallel processing unit; and hardware logic arranged to check if an ALU targeted by the decoded instruction is the primary instruction pipeline and in response to determining that the ALU targeted by the decoded instruction is a primary instruction pipeline, to check the list associated with the primary instruction pipeline to determine whether the scheduled task is already included in the list and in response to determining that the scheduled task is already included in the list, to send the decoded instruction to the primary instruction pipeline.

A third aspect provides an integrated circuit manufacturing system comprising: a computer readable storage medium having stored thereon a computer readable description of an integrated circuit that describes an instruction controller; a layout processing system configured to process the integrated circuit description so as to generate a circuit layout description of an integrated circuit embodying the instruction controller; and an integrated circuit generation system configured to manufacture the instruction controller according to the circuit layout description, wherein the instruction controller comprises: an input for receiving an instruction in a scheduled task in an active state from a scheduler; an instruction decoder arranged to decode the received instruction; a memory element arranged to store a list of scheduled tasks associated with a primary instruction pipeline in a parallel processing unit; and hardware logic arranged to check if an ALU targeted by the decoded instruction is the primary instruction pipeline and in response to determining that the ALU targeted by the decoded instruction is a primary instruction pipeline, to check the list associated with the primary instruction pipeline to determine whether the scheduled task is already included in the list and in response to determining that the scheduled task is already included in the list, to send the decoded instruction to the primary instruction pipeline.

Further aspects provide: a parallel processing system configured to perform the method as described herein; computer readable code configured to perform the steps of the method as described herein when the code is run on a computer; a method of manufacturing, using an integrated circuit manufacturing system, an instruction controller as described herein; computer readable code configured to cause the method as described herein to be performed when the code is run; an integrated circuit definition dataset that, when processed in an integrated circuit manufacturing system, configures the integrated circuit manufacturing system to manufacture an instruction controller as described herein; a computer readable storage medium having stored thereon a computer readable description of an integrated circuit that, when processed in an integrated circuit manufacturing system, causes the integrated circuit manufacturing system to manufacture an instruction controller as described herein; and an integrated circuit manufacturing system configured to an instruction controller as described herein.

The instruction controller and/or scheduled task scheduler described herein may be embodied in hardware on an integrated circuit. There may be provided a method of manufacturing, at an integrated circuit manufacturing system, an instruction controller and/or scheduled task scheduler as described herein. There may be provided an integrated circuit definition dataset that, when processed in an integrated circuit manufacturing system, configures the system to manufacture an instruction controller and/or scheduled task scheduler as described herein. There may be provided a non-transitory computer readable storage medium having stored thereon a computer readable description of an integrated circuit that, when processed, causes a layout processing system to generate a circuit layout description used in an integrated circuit manufacturing system to manufacture an instruction controller and/or scheduled task scheduler as described herein.

There may be provided an integrated circuit manufacturing system comprising: a non-transitory computer readable storage medium having stored thereon a computer readable integrated circuit description that describes the instruction controller and/or scheduled task scheduler as described herein; a layout processing system configured to process the integrated circuit description so as to generate a circuit layout description of an integrated circuit embodying the instruction controller and/or scheduled task scheduler as described herein; and an integrated circuit generation system configured to manufacture the instruction controller and/or scheduled task scheduler as described herein according to the circuit layout description.

There may be provided computer program code for performing any of the methods described herein. There may be provided non-transitory computer readable storage medium having stored thereon computer readable instructions that, when executed at a computer system, cause the computer system to perform any of the methods described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

Figure 1:
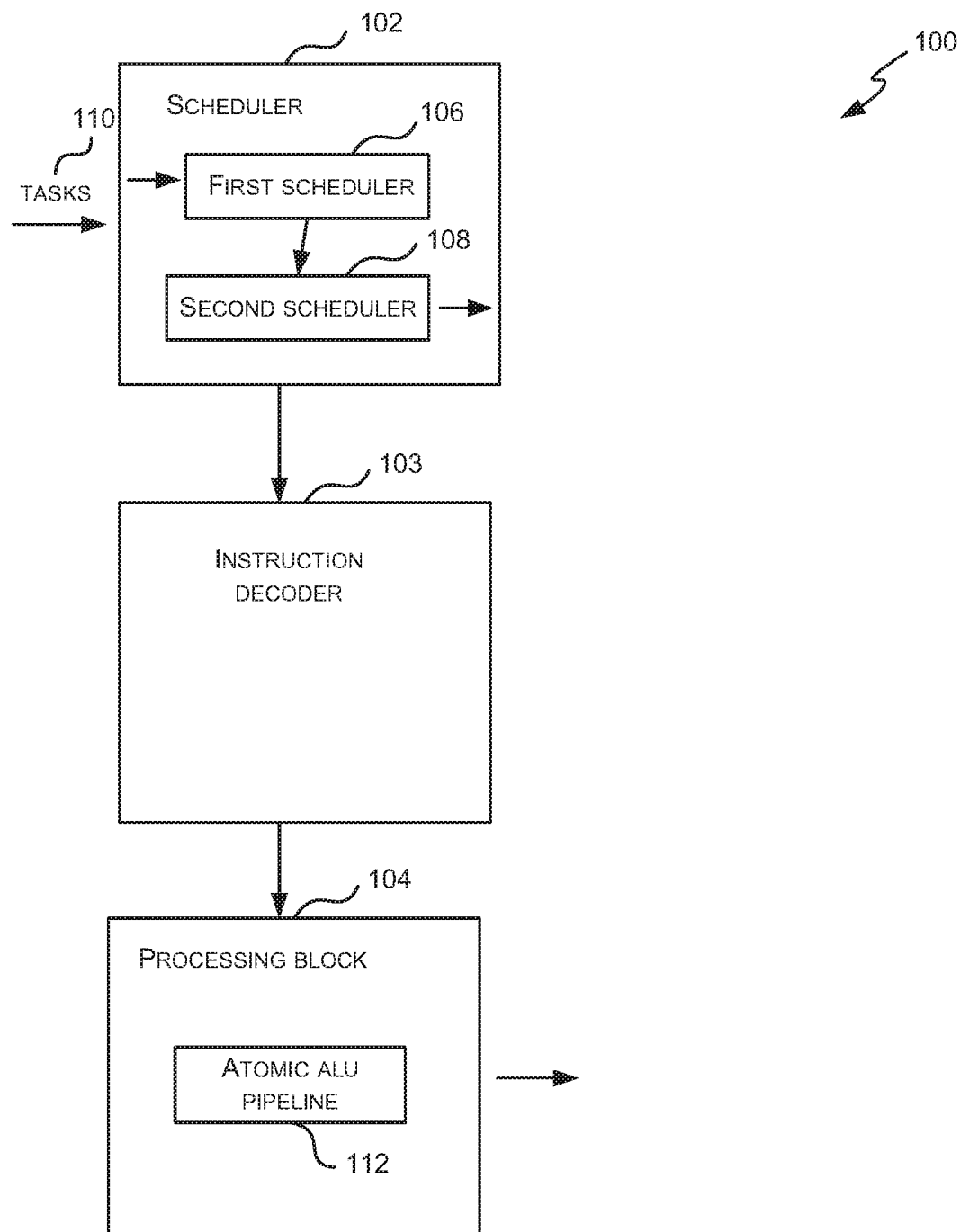
FIG. 1 is a schematic diagram of an example processor.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Embodiments will now be described by way of example only.

Various methods and apparatus for scheduling within a GPU or other parallel processing unit (such as for high performance computing applications) are described herein. In particular, the methods described herein relate to scheduling of tasks once all their dependencies have been met and they have all the resources required to run.

The term 'task' is used herein to refer to a group of data-items and the work that is to be performed upon those data-items. For example, a task may comprise or be associated with a program or reference to a program (e.g. the same sequence of ALU instructions or reference thereto) in addition to a set of data that is to be processed according to the program, where this set of data may comprise one or more data elements (or data-items, e.g. a plurality of pixels or vertices).

The term 'program instance' is used herein to refer to individual instances that take a path through the code. A program instance therefore refers to a single data-item and a reference (e.g. pointer) to a program which will be executed on the data-item. A task therefore could be considered to comprise a plurality of program instances (e.g. up to 32 program instances), though in practice only a single instance of the common program (or reference) is required per task. Groups of tasks that share a common purpose, share local memory and may execute the same program (although they may execute different parts of that program) or compatible programs on different pieces of data may be linked by a group ID. A group of tasks with the same group ID may be referred to as a 'work-group' (and hence the group ID may be referred to as the 'work-group ID'). There is therefore a hierarchy of terminology, with tasks comprising a plurality of program instances and groups (or work-groups) comprising a plurality of tasks.

The methods described herein relate to two layers of scheduling tasks, the first layer of task scheduling being performed once all their dependencies have been met and they have all the resources required to run, in order to form a set of "scheduled tasks". Tasks that are scheduled may spawn more than one "scheduled task" (e.g. for example where multi-sample anti-aliasing, MSAA, is used a single task may schedule 2, 4, 8 or more scheduled tasks depending upon the particular MSAA rate). The methods herein also relate to scheduling, in the second layer of scheduling, one or more of the scheduled tasks from the set of currently scheduled tasks to form a set of active tasks from the scheduled tasks, where the active tasks are to be executed by the parallel processor and may be a proper subset of the scheduled tasks. Therefore the methods may be described as method for scheduling scheduled tasks and the methods may be implemented by a scheduled task scheduler (which is distinct from a task scheduler which initially schedules tasks). The scheduled task scheduler may be part of a larger scheduler which comprises both the scheduled task scheduler and a task scheduler which is arranged to schedule scheduled tasks for execution before they have all the resources required to run. Tasks are scheduled initially by the task scheduler (and are scheduled only once by the task scheduler, unless it is a multi-phase task) and once a task is scheduled (and becomes a scheduled task), the corresponding scheduled tasks may be scheduled many times by the scheduled task scheduler. In particular, there may be many scheduled tasks and only a proper subset of these scheduled tasks may be active (i.e. running and executing in a processing block) at any time. Consequently scheduled tasks may be scheduled (i.e. become active) and de-scheduled (e.g. by being placed into one or more Waiting states' where they are not active) many times by the scheduled task scheduler before a task is completed. For the sake of clarity and brevity, reference to the scheduling of scheduled tasks (by the scheduled task scheduler) will be referred to as "activating" or "re-activating" scheduled tasks (as the case may be) and the de-scheduling of scheduled tasks (by the scheduled task scheduler) will be referred to as "de-activating" scheduled tasks. Accordingly any reference to activation, deactivation or reactivation may be considered to be a reference to the scheduling of scheduled tasks for execution.

When a task is received by the task scheduler which schedules tasks, the received task is scheduled and is added to a queue (which may be referred to as a scheduled task queue) and is now ready to be selected (e.g. activated) by the scheduled task scheduler and executed (and hence the scheduled task becomes active). When a scheduled task is active, instructions from the scheduled task are sent to an instruction decoder to be decoded and then the decoded instructions are passed to the appropriate ALU for execution.

Each scheduled task in the scheduled task scheduler has associated state data which identifies the current state of the scheduled task, where a scheduled task may be active (i.e. executing on a processing block within the GPU or other parallel processing unit) or not active (i.e. not executing on a processing block within the GPU or other parallel processing unit). Whilst there may only be one possible active state, in various examples, there may be a plurality of not active states. In various examples there may be at least two distinct not active states: a 'ready state and one or more waiting' states. A scheduled task in the ready state is available to be selected by the scheduled task scheduler for execution and once selected (i.e. activated) the scheduled task would move from the ready state into the active state. A scheduled task in a waiting state, in contrast, is not available to be selected by the scheduled task scheduler and a waiting state has associated criteria which specify when the scheduled task can be placed back into the ready state. In examples where there are different waiting states, these may have different associated criteria and various examples are described in the different methods described below. A waiting state may also be referred to as a de-activated state, as typically a scheduled task is placed into a waiting state when it is de-activated (i.e. when it is removed from the active state for some reason) and hence stops being executed by the processing block.

The state data for each scheduled task may be stored with the scheduled task in the scheduled task queue (e.g. where there is a single queue which stores scheduled tasks in various different states, as identified by the state data for each scheduled task). In other examples there may be multiple queues of scheduled tasks, with each queue corresponding to a particular state and comprising only the scheduled tasks that are in that state (e.g. an active queue comprising only those scheduled tasks in the active state, and one or more not active queues each comprising scheduled tasks in a different one of the not active states).

The number of active scheduled tasks in the scheduled task scheduler is a proper subset of the total number of scheduled tasks in the scheduled task scheduler. In various examples the number of active scheduled tasks is determined by the latency of an instruction decoder within the processing block multiplied by the number of instruction decoders, e.g. such that if the latency of the instruction decoder is 7 clock cycles and there are two instruction decoders, there will be 14 active scheduled tasks. Once the maximum number of active scheduled tasks is reached, another scheduled task cannot become active until one of the currently active scheduled tasks is de-activated (e.g. by being placed into a waiting state or into the ready state). Once the number of active scheduled tasks falls below the maximum permitted number, the scheduled task scheduler selects a scheduled task to become active and in various examples, the scheduled task scheduler selects the oldest scheduled task in the scheduled task scheduler which is in the ready state to become active. Selection of the oldest scheduled task to become active is one example of a scheduled task selection scheme (i.e. activation scheme) and in other examples, different schemes may be used.

Described herein are various methods and apparatus for scheduling (e.g. activating, deactivating and/or reactivating) scheduled tasks within a GPU or other parallel processing unit. Although the methods described herein are described as being implemented in hardware, at least one of the methods described herein enables software to control, or at least influence, the activation process and the methods may alternatively be implemented, at least partially, in software (e.g. by replacing a hardware state machine with a programmable sequencer which executes microcode that implements the state machine functionality). In the methods described herein, the scheduled task scheduler activates scheduled tasks which are in a ready state based on pre-defined criteria, such as age-based criteria (as described above). The scheduling is then modified by the scheduled task scheduler or by the instruction controller which selectively triggers the de-activation of scheduled tasks, i.e. by causing the scheduled task scheduler to place a scheduled task either back into the ready state or into a waiting state. Depending upon the method described, there may be a number of possible waiting states into which a scheduled task is placed and the current state of any scheduled task may be recorded using state data stored within the queue of scheduled tasks or by moving the scheduled task to the appropriate queue (e.g. where different queues in the scheduled task scheduler correspond to the different possible waiting states). Additionally, depending upon the method described, a scheduled task may be de-activated based on the workload of the target ALU (or ALU pipeline) where the workload may be defined in terms of a number of instructions or a number of scheduled tasks that can send instructions to the target ALU pipeline.

Also described herein are methods and apparatus for synchronizing a group of scheduled tasks into a known state within a GPU or other parallel processing unit. In various applications (e.g. OpenCL) the synchronization process may be referred to as a work-group barrier and so the methods and apparatus described herein may be used to implement work-group barriers. However, the methods and apparatus are not limited to OpenCL and are also applicable to other compute APIs (e.g. HSA and DX compute).

The methods for synchronizing a group of scheduled tasks into a known state may be implemented by a scheduled task scheduler and an ALU within the GPU or other parallel processing unit. The scheduled task scheduler uses a waiting state referred to herein as a sleep state and a new instruction which is executed by the ALU to synchronize scheduled tasks with the same group ID. The methods described avoid the need to use a lock (where a lock only allows one scheduled task to progress at a time through sections of code protected by a lock), reduce software overhead (as a single instruction is used) and are faster (as the methods are implemented predominantly in hardware).

Although the different methods are described separately in the following description, it will be appreciated that the methods may be implemented independently or any two or more of the methods described herein may be implemented together.

Methods and apparatus for synchronizing a group of scheduled tasks within a GPU or other parallel processing unit can be described with reference to FIGS. 1-2.

FIG. 1 is a schematic diagram showing a processor 100 which may be a GPU or other parallel processing unit. It will be appreciated that FIG. 1 only shows some elements of the processor and there may be many other elements (e.g. caches, interfaces, etc.) within the processor that are not shown in FIG. 1. The processor 100 comprises a scheduler 102, an instruction decoder 103 and a processing block 104.

The processing block 104 comprises hardware logic for executing the instructions within scheduled tasks that are scheduled for execution by the scheduler 102 and which have been decoded by the instruction decoder 103. The processing block 104 therefore comprises many arithmetic logic units (ALUs) and the ALUs may be grouped in any way. The processing block 104 may comprise different types of ALUs, e.g. with each type of ALU being optimized for a particular type of computation. In examples where the processor 100 is a GPU, the processing block 104 may comprise a plurality of shader cores, with each shader core comprising one or more ALUs. In various examples, the processing block 104 may be a single-instruction multi-data (SIMD) processor (which may in various examples it may be referred to as a Unified Shading Cluster (USC)) or a single-instruction single-data (SISD) processor.

The scheduler 102 comprises a first (or task) scheduler 106 and a second (or scheduled task) scheduler 108. As described above, tasks are generally scheduled only once by the first scheduler 106 (unless a task is a multi-phase task); however, once a task is scheduled (and becomes a scheduled task or multiple scheduled tasks, e.g. in the case of MSAA), the corresponding scheduled task(s) may be scheduled many times by the second (scheduled task) scheduler 108. In particular, there may be many scheduled tasks which correspond to tasks and only a proper subset of these scheduled tasks may be active (i.e. running and executing in the processing block 104) at any time. Consequently scheduled tasks may be activated (i.e. become active) and de-activated (e.g. by being placed into one or more 'waiting states' where they are not active) by the second scheduler 108 many times before a scheduled task is completed.

As shown in FIG. 1, the processing block 104 comprises an ALU pipeline 112, referred to as an 'atomic ALU pipeline' which is used to synchronize groups of scheduled tasks as described in more detail below. The atomic ALU pipeline 112 may be dedicated to the purpose of synchronizing groups of scheduled tasks or may additionally perform other atomic operations and in various examples there may be more than one atomic ALU pipeline 112. Each group of scheduled tasks has an assigned area of local memory and this is used by the atomic ALU pipeline 112 to store data that it uses to perform the synchronization of scheduled tasks within a group.

As shown in FIG. 1, the scheduler 102 receives tasks 110 and the first scheduler 106 selectively schedules these tasks 110 for execution by the processing unit 104. Once a task is scheduled by the first scheduler 106 all its dependencies will have been met and it has the required resources allocated to it. The scheduled task(s) corresponding to the task are then selectively activated and de-activated by the second scheduler 108.

Figure 2:
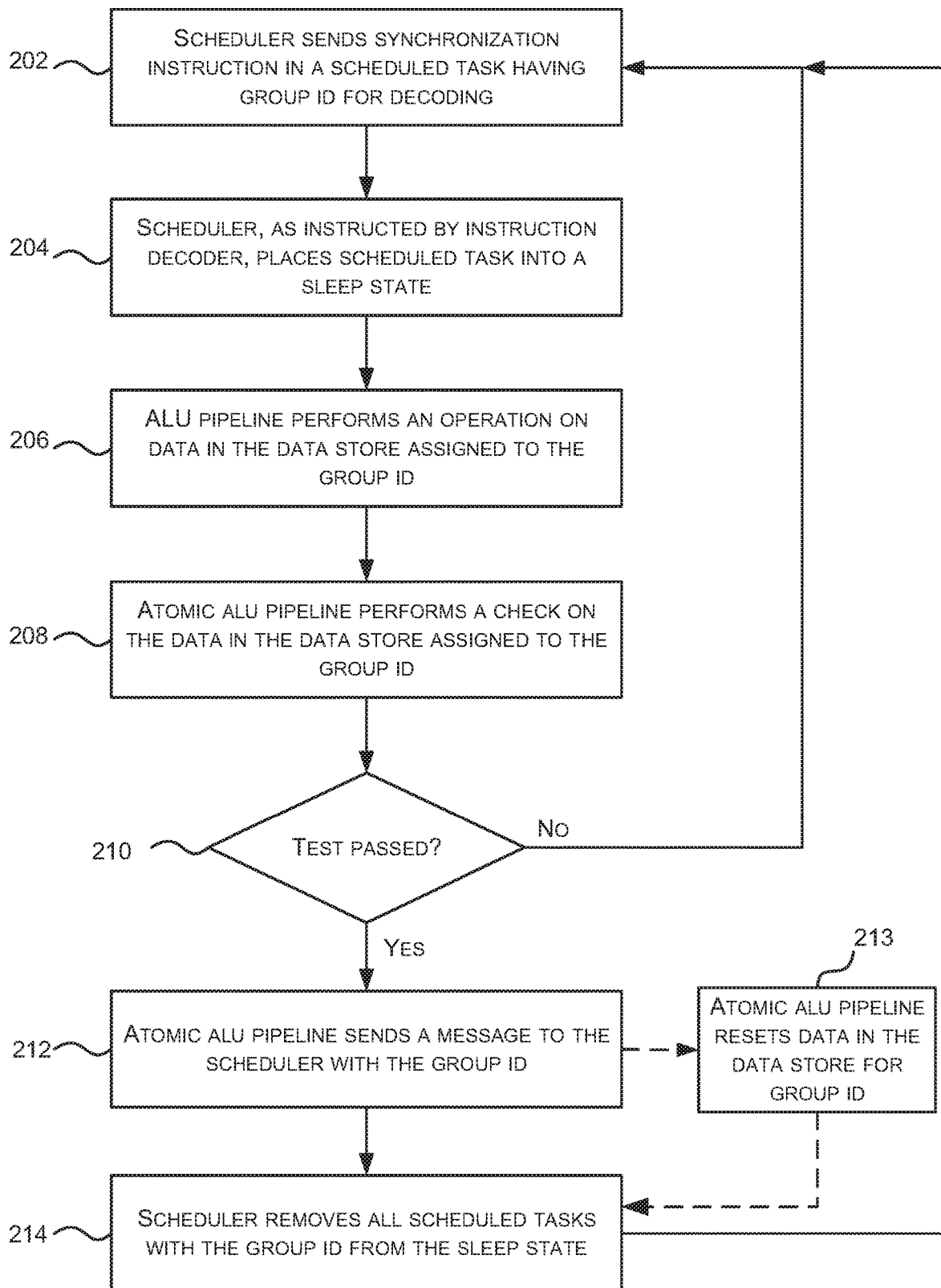
FIG. 2 is a flow diagram of a method of synchronizing a group of scheduled task in a processor.

FIG. 2 is a flow diagram of an example method of synchronizing a group of scheduled tasks in a processor 100 (which may be a GPU or other parallel processing unit) as shown in FIG. 1. The second scheduler 108 activates scheduled tasks and sends instructions from activated scheduled tasks to be decoded by the instruction decoder 103 and then executed by ALUs within the processing block 104. As shown in FIG. 2, when the second scheduler 108 sends a particular type of instruction, referred to herein as a synchronization instruction, for decoding (block 202), the second scheduler 108 receives, in response, an indication from the instruction decoder 103 to place the particular scheduled task into a sleep state and so the scheduled task is placed into the sleep state (block 204). The decoded synchronization instruction is sent to the atomic ALU pipeline 112 (by the instruction decoder 103) and the decoded synchronization instruction comprises the group identifier (ID) of the scheduled task to which the synchronization instruction relates or otherwise identifies the group to which the scheduled task belongs. In various examples, the instruction may also identify the particular scheduled task in which the synchronization instruction has been received (e.g. by means of a scheduled task ID).

By putting a scheduled task into a sleep state (in block 204), the scheduled task is de-activated by the second scheduler 108. Whilst in the sleep state (which is an example of a waiting state), a scheduled task cannot be re-activated (e.g. based on age-based criteria or other criteria). In various examples a second scheduler 108 may implement different types of waiting state, each of which has pre-defined conditions that determine when the scheduled task can be removed from the waiting state. For the purposes of synchronizing a group of scheduled task, scheduled tasks are placed into a waiting state referred to as a sleep state and cannot exit that state (and hence be re-activated) until a message is received from the atomic ALU pipeline which identifies the group ID of the scheduled task.

In response to receiving an instruction from the instruction decoder 103 identifying a particular group of scheduled tasks (e.g. by means of the group ID) and optionally identifying a particular scheduled task within the group (e.g. by means of a scheduled task ID), the atomic ALU pipeline 112 performs an operation on data stored in a data store (i.e. an area of local memory) assigned to the particular group (block 206).

Having performed the operation (in block 206), the atomic ALU pipeline 112 performs a check on the data stored in the data store assigned to the particular group (block 208) and this check may comprise comparing the data to a pre-defined value (e.g. comparing the value of the counter to a target value which may be one or N, where N is an integer) or values (e.g. checking whether all the bits in the store have been set, where each bit corresponds to one scheduled task in the group).

In various examples, the operation that is performed (in block 206) may comprise incrementing or decrementing a counter. For example, if there are N scheduled tasks within a group, a counter may initially be set to 0 and then the operation (in block 206) may increment this counter each time an instruction is received which relates to the particular group. In such an example, the check which is performed may be to compare the counter value to a target value of N. Alternatively, the counter may initially be set to N and the operation (in block 206) may decrement this counter each time an instruction is received which relates to the particular group. In such an example, the check which is performed may be to (in block 208) compare the counter value to a target value of zero.

In other examples, the operation that is performed (in block 206) may comprise setting a bit corresponding to the scheduled task ID. For example, if there are N scheduled task within a group, the operation may set a bit in the data store for the group each time an instruction is received which relates to the particular group. In such an example, the check which is performed (in block 208) may be to compare the stored data to see if all the bits have been set. Alternatively, the operation may store a scheduled task ID in the data store for the group each time an instruction is received which relates to the particular group and which includes a scheduled task ID (or otherwise identifies a particular scheduled task). In such an example, the check which is performed (in block 208) may be to compare the stored data to see if all the required scheduled task IDs (or the right number of scheduled task IDs) have been stored.

If the check (in block 208) is not passed ('No' in block 210) because the data stored does not match the target value(s), then no further action is taken by the atomic ALU pipeline 112 at this stage.

If, however, the check (in block 208) is passed (Yes' in block 210) because the data does match the target value(s), then the atomic ALU pipeline 112 sends a message to the second scheduler 108 which identifies the particular group to which it relates (block 212), i.e. the message identifies the group to which the check which passed relates. The atomic ALU pipeline 112 may additionally reset the data stored in the data store assigned to the group of scheduled tasks (block 213) e.g. by clearing the data stored or by resetting the counter to zero or N.

In response to receiving a message from the atomic ALU pipeline 112 identifying a group, the second scheduler 108 removes all scheduled tasks for the identified group from the sleep state (block 214). This means that these scheduled tasks can now be rescheduled immediately or at any point subsequently (e.g. using any suitable method and criteria). In various examples, when exiting a sleep state a scheduled task will be available to be activated according to another activation method implemented by the second scheduler 108.

Although in the examples described above the instructions and other messages sent between the second scheduler 108 and the atomic ALU pipeline 112 identify a group (e.g. by means of a group ID), in other examples, there may be separate atomic ALU pipelines 112 for each group and so the instructions and other messages sent between the second scheduler 108 and the atomic ALU pipeline 112 inherently identify a group of scheduled tasks (by means of either the source or destination of an instruction or other message) and so do not need to include a group ID or other identifier.

By using the method shown in FIG. 2 and described above, all the scheduled tasks in a group exit from the sleep state (and hence are available to be rescheduled) at the same time. This means that the data stored in the data store assigned to the group of scheduled tasks (as updated by the atomic ALU pipeline 112) is no longer required and can be over-written (e.g. to perform a subsequent synchronization operation for the same group of scheduled tasks) or re-allocated (e.g. to a different group of scheduled tasks). Furthermore, as the atomic ALU pipeline 112 performs the update on the data (in block 206) and the check on the updated data (in block 208) in response to a single instruction (the synchronization instruction), there is no need for a lock. This is because the operations are inherently serialized (i.e. the operations are always executed sequentially) and there is no possibility that another instruction can over-write the data in the data store in between the update operation (in block 206) and the check on the data (in block 208).

Although the method shown in FIG. 2 can be used to synchronize all the scheduled tasks in a group (where a group comprises a collection of scheduled tasks with the same group ID), in other examples, the method may alternatively (or in addition) be used to synchronize a proper subset of the scheduled tasks within a group. For example, a proper subset of the scheduled tasks may be synchronized by setting the value of N (which may be the initial counter value or the target counter value, as described above) to the number of scheduled tasks which need to be synchronized. Using this technique, any number of subsets may be synchronized with divergent synchronization points between the subsets by providing each subset with its own data store.

By using the method shown in FIG. 2 and described above, the synchronization of scheduled tasks is implemented predominantly in hardware (by the atomic ALU pipeline 112 and second scheduler 108) and so operates more quickly and reduces the complexity of the software code (e.g. compared to known methods which require many instructions to implement the synchronization of work-items). Furthermore, use of a single instruction rather than multiple instructions reduces the software overhead.

Using the method shown in FIG. 2 and described above, a single atomic ALU pipeline 112 may perform synchronization for multiple groups.

Methods and apparatus for scheduling (e.g. activating, deactivating and/or reactivating) scheduled tasks within a GPU or other parallel processing unit which prevents ALU pipeline stalls can be described with reference to FIGS. 3-5.

Figure 3:
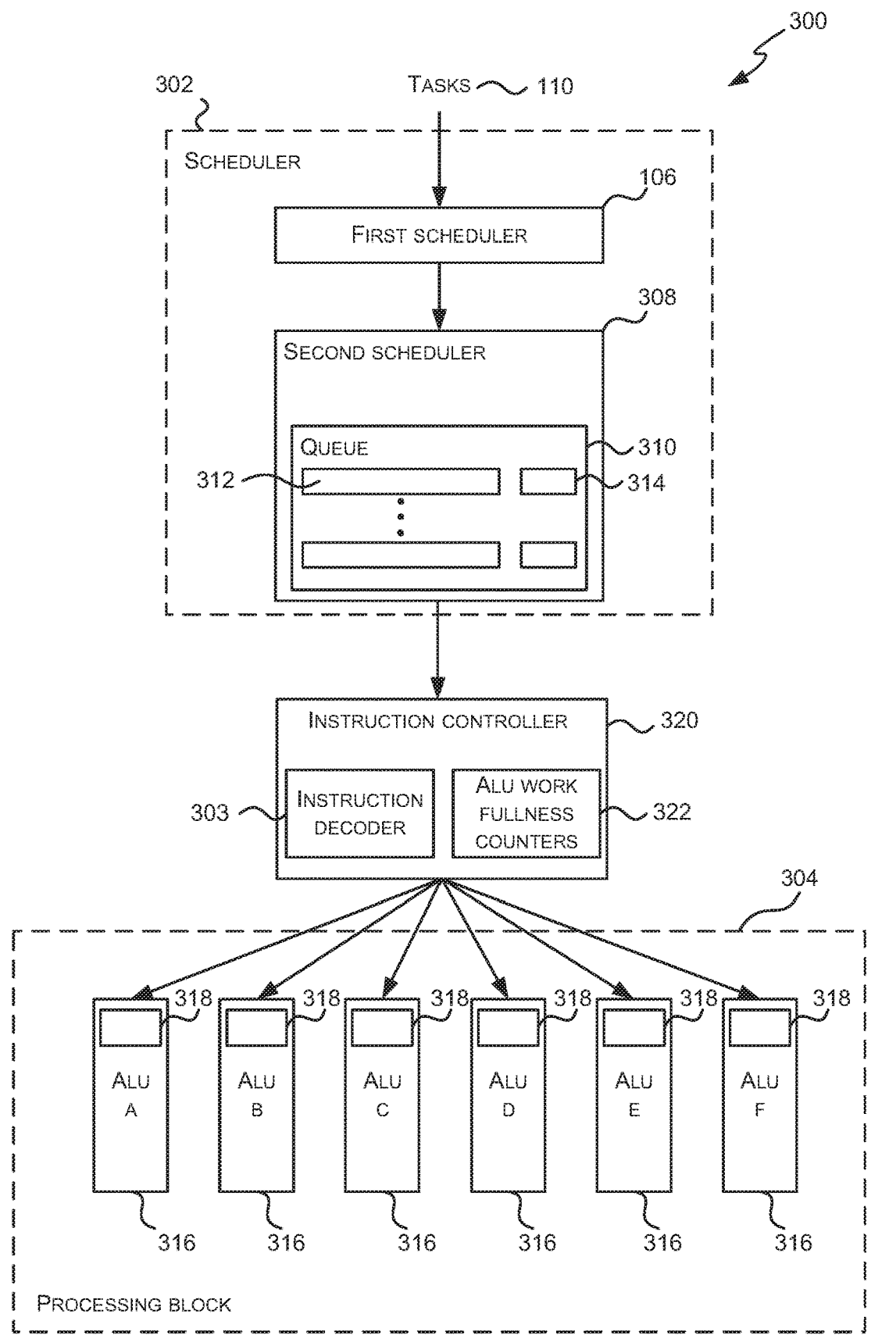
FIG. 3 is a schematic diagram of another example processor.

FIG. 3 is a schematic diagram showing a processor 300 which may be a GPU or other parallel processing unit. It will be appreciated that FIG. 3 only shows some elements of the processor and there may be many other elements (e.g. caches, interfaces, etc.) within the processor that are not shown in FIG. 3. The processor 300 comprises a scheduler 302, an instruction decoder 303 (which is part of an instruction controller 320) and a processing block 304.

The scheduler 302 comprises a first scheduler 106 which schedules tasks and a second scheduler 308 which schedules (e.g. activates, deactivates and/or reactivates) scheduled tasks. As described above, tasks are generally scheduled only once by the first scheduler 106; however, once a task is scheduled, the corresponding scheduled tasks may be scheduled (e.g. activated or reactivated) many times by the second scheduler 108. In particular, there may be many scheduled tasks and only a proper subset of these scheduled tasks may be active (i.e. running and executing in the processing block 304) at any time. Consequently scheduled tasks may be activated (i.e. become active) and de-activated (e.g. by being placed into one or more 'waiting states' where they are not active) many times before the processing of a scheduled task is completed.

The second scheduler 308 comprises one or more scheduled task queues 310 which store scheduled tasks 312. In various examples the second scheduler 308 comprises a single scheduled task queue 310 and this queue 310 also stores state data 314 for each of the stored scheduled tasks 312 (such that the state data 314 for a scheduled task 312 may be described as being associated with a scheduled task 312) and the state data 314 for a scheduled task 312 identifies the current state that the scheduled task 312 is in, e.g. whether it is in an active, ready or waiting state and where there are multiple waiting states, which particular waiting state it is currently in. The state data 314 for a scheduled task 312 may also comprise flag data where the flag may be set or not set for a scheduled task and the operation of this flag is described below. Alternatively the flag data may be stored within the instruction controller 320. In other examples, the second scheduler 308 comprises multiple queues, each queue corresponding to a different state and storing scheduled tasks which are in the particular state (e.g. a 'ready' queue, an 'active' queue and one or more 'waiting' queues). These multiple queues may also comprise the flag data or the flag data (where provided) may be stored within the instruction controller 320.

The processing block 304 comprises hardware logic for executing the instructions within tasks that are scheduled for execution by the scheduler 302. The processing block 304 therefore comprises a plurality of arithmetic logic unit (ALU) pipelines 316 and the ALU pipelines may be grouped in any way. The processing block 304 may comprise different types of ALU pipelines 316, e.g. with each type of ALU pipeline being optimized for a particular type of computation. Each ALU pipeline 316 comprises a queue 318 which stores a queue of work to be performed by the ALU pipeline (i.e. one or more instructions to be executed by the ALU pipeline 316). In examples where the processor 300 is a GPU, the processing block 304 may comprise a plurality of shader cores, with each shader core comprising one or more ALU pipelines 316. In various examples, the processing block 304 may be a single-instruction multi-data (SIMD) processor (which may in various examples it may be referred to as a Unified Shading Cluster (USC)) or a single-instruction single-data (SISD) processor.

The instruction controller 320 comprises one or more instruction decoders 303 and a plurality of ALU work fullness counters 322.

As shown in FIG. 3, the scheduler 302 receives tasks 110 and the first scheduler 106 selectively schedules these tasks 110 for execution by the processing unit 304. The scheduled tasks 312 are stored in the scheduled task queue 310 by the second scheduler 308 (or in a ready queue, where there are multiple queues) and then scheduled (e.g. activated, deactivated and/or reactivated) by the second scheduler 308. When a scheduled task 312 is activated by the second scheduler 308, its state changes from a not active state (e.g. a ready state) to an active state and it is sent to the instruction controller 320. When a scheduled task changes state, its state data is updated or the scheduled task may be moved between queues to indicate the change in state.

The instruction controller 320 receives active scheduled tasks from the second scheduler 308 and decodes instructions associated with the active scheduled tasks using the instruction decoder 303. The instruction controller 320 then sends the decoded instructions to the targeted ALU pipeline 316 (i.e. to the ALU pipeline 316 which can execute the instruction). The instruction controller 320 uses the plurality of ALU work fullness counters 322 to track how much work each ALU pipeline 316 has and the operation of these counters 322 and the instruction controller 320 are described in more detail below.

Figure 4:
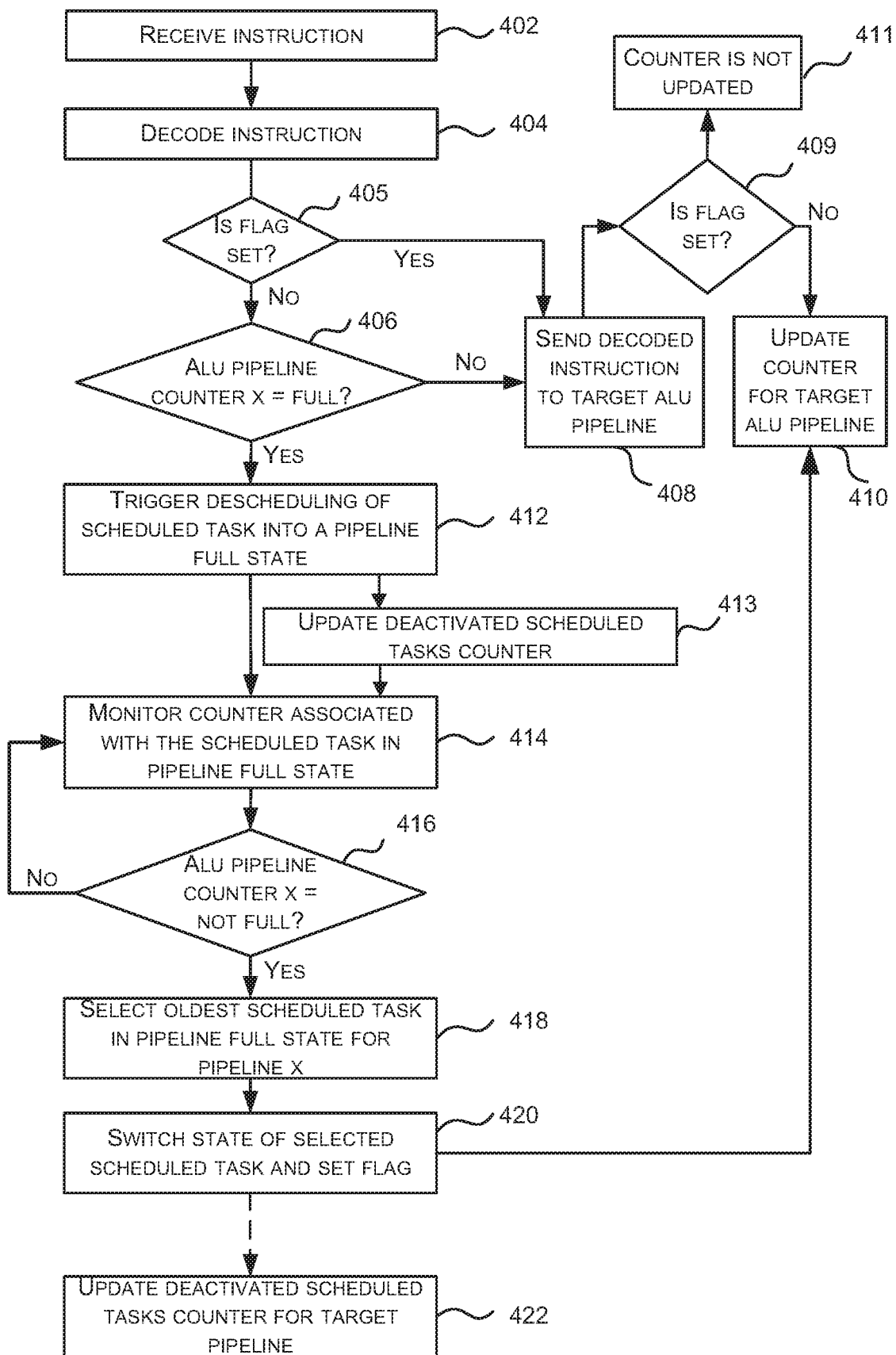
FIG. 4 is a flow diagram of an example method of scheduling scheduled tasks within a processor.
Figure 5:
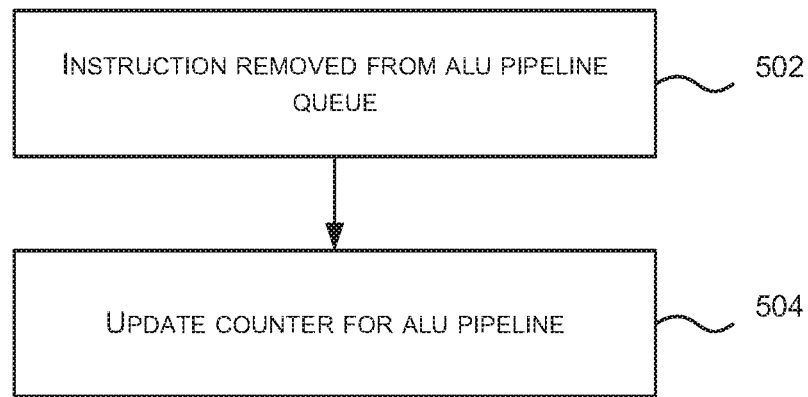
FIG. 5 is a flow diagram of a further part of the example method of scheduling scheduled tasks as shown in FIG. 4.

FIG. 4 is a flow diagram of an example method of scheduling scheduled tasks within a GPU or other parallel processing unit which reduces (or eliminates) ALU pipeline stalls in a processor 300 (which may be a GPU or other parallel processing unit) as shown in FIG. 3. The second scheduler 308 activates scheduled tasks and sends instructions from activated tasks to be decoded by the instruction controller 320 (by the instruction decoder 303) and then executed by ALU pipelines 316 within the processing block 304). As shown in FIG. 4, in response to receiving an instruction for decoding (block 402), the instruction controller 310 decodes the instruction (block 404, in the instruction decoder 303) and then checks whether the ALU pipeline that will execute the decoded instruction (referred to as the target ALU pipeline) is full (block 406), where this check uses the ALU work fullness counter 322 for the target pipeline.

If it is determined (by the instruction controller 320) that the scheduled task to which the instruction relates does not have a flag set ('No' in block 405) and that the target ALU pipeline is not full ('No' in block 406), then the decoded instruction is sent to the target ALU pipeline 316 (block 408) and the ALU work fullness counter 322 for the target pipeline is updated (block 410), e.g. the ALU work fullness counter 322 for the target pipeline is updated (e.g. incremented). The operation where the scheduled task has the flag set (Yes' in block 405) is described subsequently.

If, however, it is determined (by the instruction controller 320) that the scheduled task to which the instruction relates does not have a flag set ('No' in block 405) and that the target ALU pipeline is full (Yes' in block 406), then the instruction controller 320 triggers the de-activation of the scheduled task (block 412) and the decoded instruction is discarded (i.e. it is not sent to the target ALU pipeline). The de-activation is performed by the second scheduler 308 (in response to a message from the instruction controller 320) and comprises switching the scheduled task from an active state into a waiting state (e.g. as recorded in the state data 314 associated with the scheduled task 312 or by moving the scheduled task between different queues 310). The scheduled task is switched into a waiting state which may be referred to as a 'pipeline full state' for the particular target ALU pipeline or a 'waiting for pipeline X' state, where the X corresponds to the particular target ALU pipeline (e.g. one of ALU pipelines A-F in the example shown in FIG. 3). Consequently, when implementing this method, there may be multiple waiting states that can be identified by the state data 314 within the queue 310 or multiple waiting queues (one for each waiting state), where the multiple waiting states comprise at least a 'waiting for pipeline X' state for a plurality (e.g. each) of the ALU pipelines in the processing block 304. In other examples, there may be a single 'pipeline full' (or 'waiting for pipeline') state with the particular pipeline that any scheduled task is waiting for being identified in sideband data. This sideband data is sent for a scheduled task from the instruction controller 320 to the scheduler 308 when the instruction controller 320 de-activates a scheduled task (e.g. in block 412).

The second scheduler 308 monitors the ALU work fullness counters 322 associated with any scheduled tasks 312 in the queue 310 that are in a pipeline full' state (blocks 414-416). For example, if the queue 310 comprises one scheduled task in a 'pipeline full' state which is waiting for pipeline A and three scheduled tasks in a 'pipeline full' state which are waiting for pipeline F, then the second scheduler 308 monitors the ALU work fullness counters 322 for ALU pipelines A and F (in blocks 414-416). In various examples, the instruction controller 320 communicates the values of the ALU work fullness counters 322 to the second scheduler 308 (e.g. the instruction controller 320 may broadcast the values) to enable the second scheduler 308 to perform the monitoring.

If the second scheduler 308 (whilst monitoring counters in blocks 414-416) identifies that the ALU work fullness counter 322 for a particular ALU pipeline (e.g. ALU pipeline X) is no longer full (Yes' in block 416), the second scheduler 308 updates the state of a scheduled task that is waiting for the particular pipeline (block 420) e.g. a scheduled task which is waiting for ALU pipeline X. Where there is more than one scheduled task which is waiting for the particular pipeline (e.g. ALU pipeline X), then the state of only one scheduled task is updated (in block 420) and the oldest scheduled task in the 'pipeline full' state that is waiting for the particular pipeline (e.g. the oldest scheduled task in the 'pipeline full' state which is waiting for ALU pipeline X) is first selected (block 418) and then the state of the selected scheduled task is updated (in block 420). As well as updating the state of a scheduled task for the particular ALU pipeline (in block 420), a flag associated with the selected scheduled task is set (in block 420) and the work fullness counter 322 for the particular ALU pipeline is updated (block 410), e.g. the counter 322 for the particular ALU pipeline is incremented.

By incrementing the counter (in block 410) and setting the flag (in block 420), the particular ALU pipeline resource is pre-allocated to the selected scheduled task and this gives priority to the next decoded instruction from the selected scheduled task over decoded instructions from other scheduled tasks which target the same ALU pipeline. Referring back to the start of FIG. 4, if an instruction is received (in block 402) and decoded (in block 404) which relates to a scheduled task that has the flag set (Yes' in block 405), then the fullness check (in block 406) is omitted. This is because the ALU work fullness counter 322 for the target pipeline will already have been updated (in block 410 of a previous execution of the method of FIG. 4) and the decoded instruction is sent to the target ALU pipeline (in block 408) irrespective of the current value of the work fullness counter for the target ALU pipeline. In contrast, if an instruction is decoded (in block 404) which targets the same ALU pipeline but which relates to a scheduled task that does not have its flag set ('No' in block 405), the fullness check (in block 406) is performed and the decoded instruction will only be sent to the target ALU pipeline if the work fullness counter indicates that the target ALU pipeline is not full ('No' in block 406). As shown in FIG. 4, a check for a flag is performed (block 409) prior to updating the ALU work fullness counter (in block 410), to avoid the counter being incremented twice for the same instruction (i.e. such that the counter is not updated if the flag is set, block 411).

For example, if ALU pipeline A is determined to no longer be full (in block 416) and scheduled task 0 is currently in 'pipeline full' state and waiting for pipeline A, scheduled task 0 is selected (in block 418), rescheduled and a flag is set for scheduled task 0 (in block 420). The ALU work fullness counter 322 for pipeline A is updated (in block 410) and this may mean that ALU pipeline A appears full again. If an instruction which targets ALU pipeline A is received (in block 402) for a different scheduled task, scheduled task 1, which does not have its flag set, before the next instruction for scheduled task 0 which targets ALU pipeline A, the incrementing of the ALU work fullness counter 322 (in block 410) will prevent the instruction from scheduled task 1 being sent to ALU pipeline A. Consequently the instruction from scheduled task 1 is prevented from causing ALU pipeline A to be full again and from blocking progression of the instruction from scheduled task 0.

The change of state of the selected scheduled task (in block 420) may switch the scheduled task from a waiting state (e.g. a waiting for pipeline X state) to a ready state, such that the scheduled task can then be selected for execution by the second scheduler 308 or alternatively the scheduled task may be switched directly from the waiting state to an active state.

In various examples, the updating of the ALU work fullness counters 322 (in block 410) comprises incrementing a counter and the fullness check (in block 406) may comprise determining if the ALU work fullness counter for the target pipeline equals (or exceeds) a value that indicates fullness. This value that indicates fullness may be the same for all ALU pipelines (and denoted F) or may be different for different ALU pipelines (and denoted F(X), where X refers to the particular ALU pipeline, such that in the example shown in FIG. 3 there are values F(A), F(B), F(C) . . . F(F)). The ALU work fullness counter for a pipeline does not solely increase but may be decremented as shown in FIG. 5. When an instruction is removed from an ALU pipeline queue 318 (block 502), the instruction controller 320 updates the ALU work fullness counter for the particular pipeline (block 504), e.g. by decrementing the counter.

When determining whether an ALU pipeline is no longer full (in block 416), the same values (e.g. F or F(X)) may be used or alternatively a different value may be used. For example, if the updating of the ALU work fullness counters 322 as decoded instructions are sent to an ALU pipeline (in block 410) comprises incrementing a counter, a different value F−Δ or F(X)−Δ may be used to provide hysteresis (i.e. such that the ALU pipeline does not show as being not full immediately that its work fullness counter falls).

Alternatively, the updating of the ALU work fullness counters 322 as decoded instructions are sent to an ALU pipeline (in block 410) may comprise decrementing a counter. In such examples, the counter is incremented when an instruction is removed from the ALU pipeline queue (in block 502). In such examples, the fullness check (in block 406) may comprise determining if the ALU work fullness counter for the target pipeline equals (or is less than) a value that indicates fullness. As described above, this value that indicates fullness may be the same for all ALU pipelines (and denoted F) or may be different for different ALU pipelines (and denoted F(X)). When determining whether an ALU pipeline is no longer full (in block 416), the same values (e.g. F or F(X)) may be used or alternatively a different value F-F+Δ or F(X)+Δ may be used to provide hysteresis (i.e. such that the ALU pipeline does not show as being not full immediately that its work fullness counter increases).

Although the method of FIG. 4 is described above with reference to ALU pipelines, the method may also be applied for ALUs which are not pipelined (i.e. where instructions execute in a single clock cycle).

In various examples, the instruction controller 320 may store multiple counters for each ALU pipeline 316, where the multiple counters for an ALU pipeline 316 comprise an ALU work fullness counter (as described above) and an ALU deactivated scheduled tasks counter. Where ALU deactivated scheduled tasks counters are used, they provide a count of how many scheduled tasks have been deactivated due to a particular ALU pipeline being full. As shown in FIG. 4, the ALU deactivated scheduled tasks counter for a particular pipeline is updated (block 413), e.g. incremented, each time a scheduled task is de-activated (in block 412) because the particular pipeline is considered full (Yes' in block 406) and is updated in the opposite direction (block 422), e.g. decremented, each time a scheduled task is removed from the waiting state (in block 420) because the particular pipeline is no longer considered full (Yes' in block 416). Where the ALU deactivated scheduled tasks counter is used, the test for fullness (in block 406) may be modified such that the value of the work fullness counter is combined with the deactivated scheduled tasks counter before being compared to the value that indicates fullness (F or F(X)). This assists in de-activating scheduled tasks earlier (i.e. at lower values of the ALU work fullness counters) and prioritizing those scheduled tasks which have previously been de-activated when an ALU pipeline has capacity (as indicated by its ALU work fullness counter). Use of the second counter, i.e. the deactivated scheduled tasks counter, may result in hardware which runs faster and occupies a smaller area.

Using the methods and apparatus for scheduling scheduled tasks within a GPU or other parallel processing unit as described above with reference to FIGS. 3-5, ALU pipeline stalls can be prevented. An ALU pipeline stall occurs when the second scheduler 308 sends scheduled tasks to be executed to the same ALU pipeline at a rate faster than the ALU pipeline can execute. This results in a backlog of scheduled tasks to be executed by the ALU pipeline and can cause the scheduler 302 to stall (which results in a drop in performance of the GPU or other parallel processing unit). By using the ALU work fullness counters described above and updating the counters when instructions are sent to an ALU pipeline and when instructions are removed from the queue in an ALU pipeline, scheduled tasks cannot be sent to an ALU pipeline at a rate faster than they can be accepted by the ALU pipeline queues 318.

Although the method is described above as using both flags (which may be referred to as 'pipeline full flags') and a pipeline fullness counter, in various examples, the pipeline full flags maybe used independently of the pipeline fullness counter. However, by using the both the flags and the pipeline fullness counters (as shown in FIG. 4 and described above), the power consumption of the apparatus is reduced. This is because if flags are used in isolation (i.e. without the pipeline fullness counters), instructions from all scheduled tasks waiting for a particular pipeline would be sent to the instruction controller 320 once the flag for the pipeline indicated the pipeline was no longer full. If, however, the pipeline does not have the capacity to accept all of these instructions, all the scheduled tasks that cannot be accommodated will then be de-activated again. The unnecessary reactivation of scheduled tasks that are then immediately de-activated results in unnecessary power consumption.

Methods and apparatus for optimizing the activation of scheduled tasks within a GPU or other parallel processing unit by prioritizing a subset (i.e. a proper subset) of the scheduled tasks can be described with reference to FIGS. 6-8.

Figure 6:
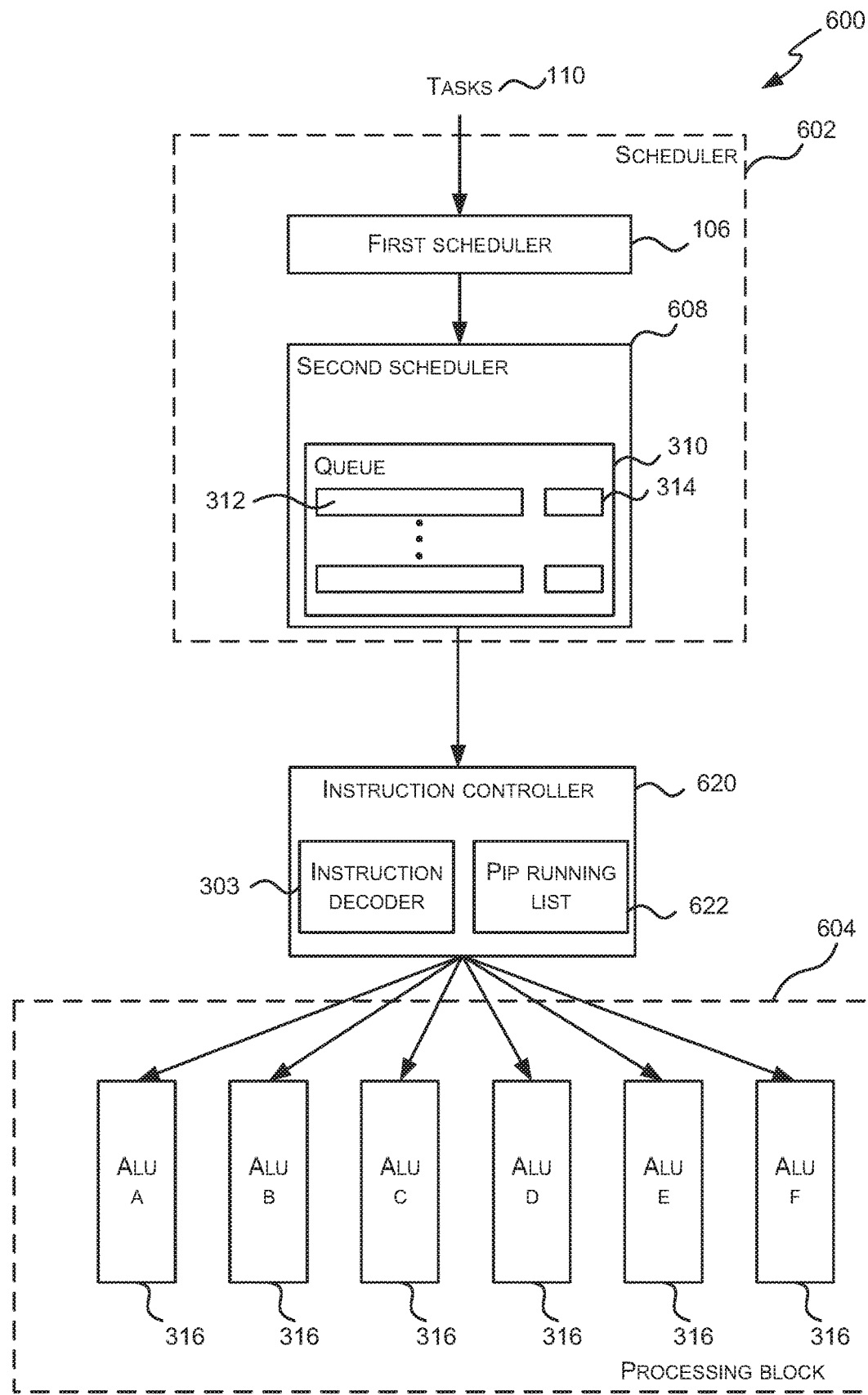
FIG. 6 is a schematic diagram of another example processor.

FIG. 6 is a schematic diagram showing a processor 600 which may be a GPU or other parallel processing unit. It will be appreciated that FIG. 6 only shows some elements of the processor and there may be many other elements (e.g. caches, interfaces, etc.) within the processor that are not shown in FIG. 6. The processor 600 comprises a scheduler 602, an instruction decoder 303 (which is part of an instruction controller 620) and a processing block 604.

The scheduler 602 comprises a first scheduler 106 which schedules tasks and a second scheduler 608 which schedules (e.g. activates, deactivates and/or reactivates) scheduled tasks. As described above, tasks are generally scheduled only once by the first scheduler 106; however, once a task is scheduled, the corresponding scheduled task(s) may be activated many times by the second scheduler 608. In particular, only a proper subset of these scheduled tasks may be active (i.e. running and executing in the processing block 604) at any time. Consequently scheduled tasks may be activated or de-activated (e.g. by being placed into one or more 'waiting states' where they are not active) and reactivated many times before a task is completed.

The second scheduler 608 comprises one or more queues 310 that store scheduled tasks 312 which correspond to tasks which have been scheduled by the first scheduler because they have the required resources (e.g. registers, memory, etc.) and their dependencies have been met. In various examples the second scheduler 608 comprises a single queue 310 and this queue 310 also stores state data 314 for each of the stored scheduled tasks 312 (such that the state data 314 for a scheduled task 312 may be described as being associated with a scheduled task 312) and the state data 314 for a scheduled task 312 identifies the current state that the scheduled task 312 is in, e.g. whether it is in an active, ready or waiting state and where there are multiple waiting states, which particular waiting state it is currently in. In other examples, the second scheduler 608 comprises multiple queues, each queue corresponding to a different state and storing scheduled tasks that are in the particular state (e.g. a 'ready' queue, an 'active' queue and one or more 'waiting' queues).

The processing block 604 comprises hardware logic for executing the instructions within scheduled tasks that are scheduled for execution by the scheduler 602. The processing block 604 therefore comprises a plurality of ALU pipelines 316 and the ALU pipelines may be grouped in any way. The processing block 604 may comprise different types of ALU pipelines 316, e.g. with each type of ALU pipeline being optimized for a particular type of computation. In examples where the processor 600 is a GPU, the processing block 604 may comprise a plurality of shader cores, with each shader core comprising one or more ALU pipelines 316. In various examples, the processing block 604 may be a single-instruction multi-data (SIMD) processor (which may in various examples it may be referred to as a Unified Shading Cluster (USC)) or a single-instruction single-data (SISD) processor.

Of the ALU pipelines 316 within the processing block 604, one may be denoted the primary instruction pipeline (PIP). This may, for example, be the most used ALU pipeline (e.g. the one which overall reads and writes the most data) and hence is the ALU pipeline that is ideally run most efficiently. The instruction controller 620 comprises one or more instruction decoders 303 and a PIP Running List 622. The PIP running list 622 lists those scheduled tasks which are currently active on the PIP (i.e. those scheduled tasks having instructions currently executing on the PIP) and the size of the PIP running list 622 is fixed, i.e. there is a maximum number of scheduled tasks that can be included in the PIP running list 622 and hence a maximum number of scheduled tasks that can have instructions executing on the PIP concurrently. In various examples the same ALU pipeline may always be denoted the PIP and in other examples, different ALU pipelines may be denoted the PIP at different times. Furthermore, although FIG. 6 shows a single PIP running list 622 and hence only one of the ALU pipelines 316 is denoted the PIP, in other examples, the instruction controller 620 may comprise multiple PIP running lists, each PIP running list corresponding to a different PIP (e.g. PIP A, PIP B, . . . ) and the operation of each PIP running list is as described below.

As shown in FIG. 6, the scheduler 602 receives tasks 110 and the first scheduler 106 selectively schedules these tasks 110 for execution by the processing unit 604 to form scheduled tasks. The scheduled tasks 312 are stored in a queue 310 by the second scheduler 608 and then scheduled (e.g. activated, deactivated and/or reactivated) by the second scheduler 608. When a scheduled task 312 is activated by the second scheduler 608, its state changes from a not active state (e.g. a ready state) to an active state and it is sent to the instruction controller 620.

The instruction controller 620 receives active scheduled tasks from the second scheduler 608 and decodes instructions associated with the active scheduled tasks using the instruction decoder 303. The instruction controller 620 then sends the decoded instructions associated with the active scheduled tasks to the targeted ALU pipeline 316 (i.e. to the ALU pipeline 316 which can execute the instruction). The instruction controller 620 uses the PIP running list 622 to control whether instructions can be executed on the PIP and the operation of the PIP running list 622 and the instruction controller 620 are described in more detail below.

Figure 7:
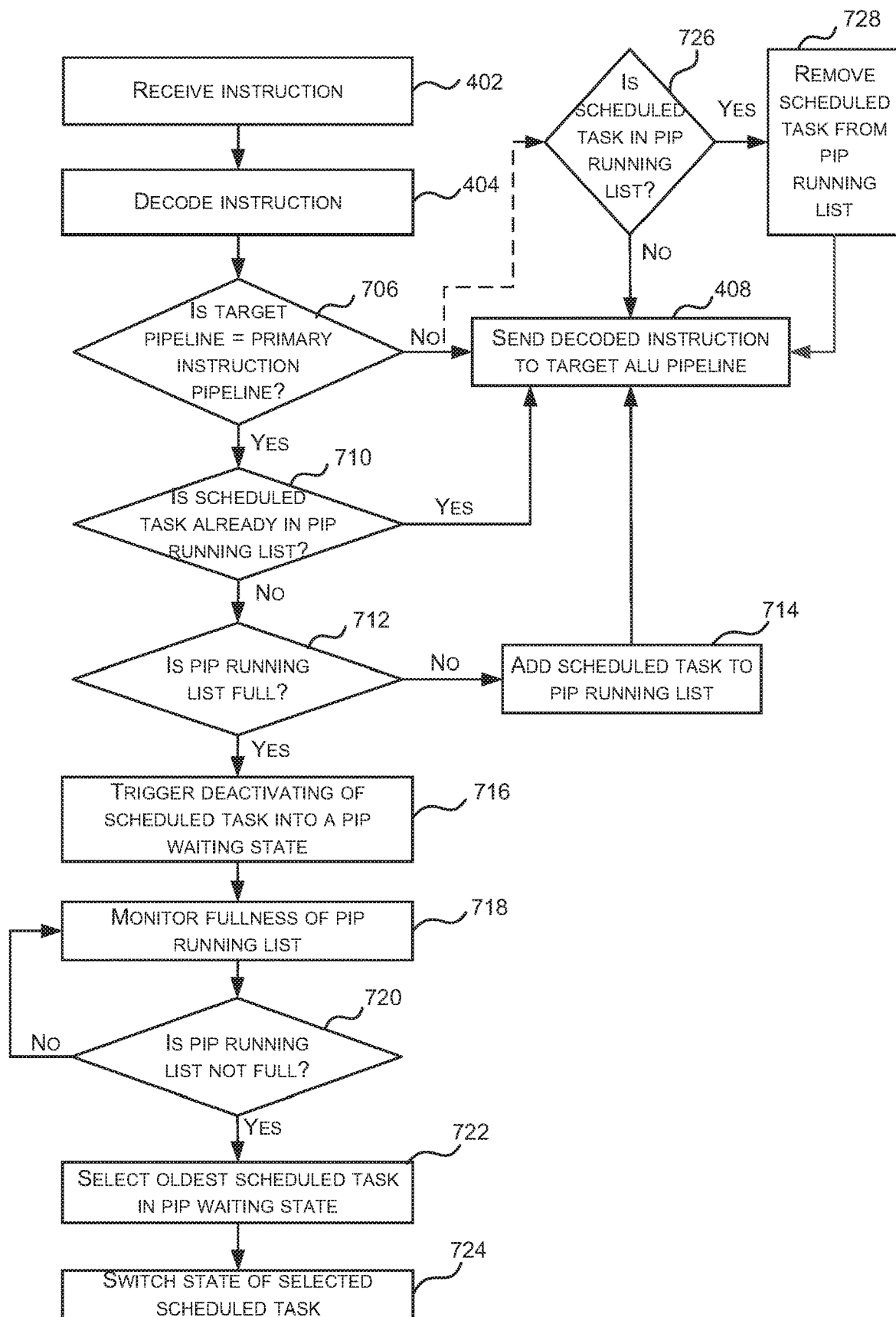
FIG. 7 is a flow diagram of another example method of scheduling scheduled tasks within a processor.
Figure 8:
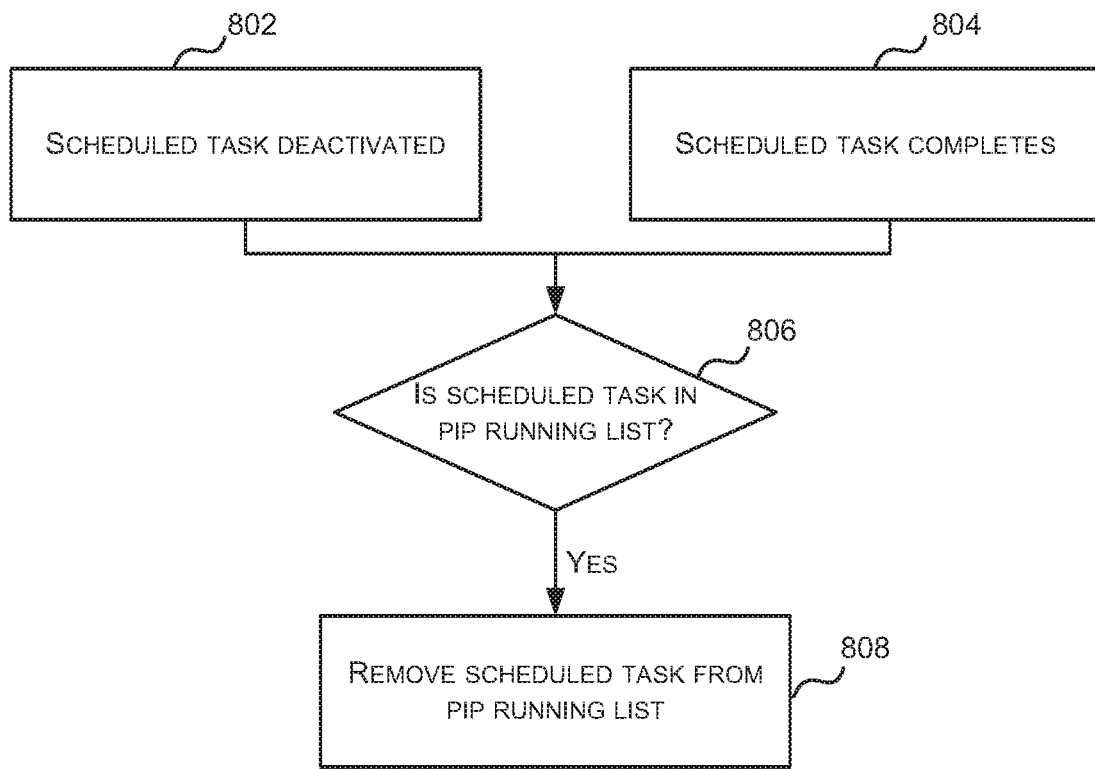
FIG. 8 is a flow diagram of a further part of the example method of scheduling scheduled tasks as shown in FIG. 7.

FIG. 7 is a flow diagram of an example method of scheduling (e.g. activating, deactivating and/or reactivating) scheduled tasks within a GPU or other parallel processing unit which optimizes the scheduling (e.g. activation) of scheduled tasks by prioritizing a proper subset of the scheduled tasks (i.e. those scheduled tasks in the PIP running list 622). As shown in FIG. 6, the second scheduler 608 activates scheduled tasks and sends instructions from activated scheduled tasks to be decoded by the instruction controller 620 and then executed by ALU pipelines 316 within the processing block 604. As shown in FIG. 7, in response to receiving an instruction for decoding (block 402), the instruction controller 620 decodes the instruction (block 404, in the instruction decoder 303) and then checks whether the ALU pipeline that will execute the decoded instruction (referred to as the target ALU pipeline) is the PIP (block 706).

If it is determined (by the instruction controller 620) that the target ALU pipeline is not the PIP ('No' in block 706), then the decoded instruction is sent to the target ALU pipeline 316 (block 408). If, however, it is determined (by the instruction controller 620) that the target ALU pipeline is the PIP (Yes' in block 706), then the instruction scheduler 620 checks the PIP running list 622 to determine whether the scheduled task to which the instruction relates is already included in the PIP running list 622 (block 710).

If it is determined (by the instruction controller 620) that the scheduled task to which the instruction relates is already in the PIP running list 622 (Yes' in block 710), then the decoded instruction is sent to the target ALU pipeline 316 (block 408), i.e. the decoded instruction is sent to the PIP. If, however, it is determined (by the instruction controller 620) that the scheduled task to which the instruction relates is not already in the PIP running list 622 ('No' in block 710), a check is performed to see whether the scheduled task to which the instruction relates can be added to the PIP running list 622 (block 712). As described above, there is a maximum number of scheduled tasks that can be included within the PIP running list 622 and if the list is not full ('No' in block 712), i.e. the maximum number of scheduled tasks in the PIP running list 622 has not been reached, then the scheduled task to which the decoded instruction relates is added to the PIP running list 622 (block 714) and then the decoded instruction is sent to the target ALU pipeline 316 (block 408), i.e. the decoded instruction is sent to the PIP.

If, however, the PIP running list 622 is full (Yes' in block 712), i.e. the maximum number of scheduled tasks in the PIP running list 622 has been reached, then the scheduled task to which the decoded instruction relates cannot be added to the PIP running list 622 and instead the instruction controller 620 triggers the de-activation of the scheduled task (block 716) and the decoded instruction is discarded. The de-activation is performed by the second scheduler 608 in response to the trigger from the instruction controller 620 and comprises switching the scheduled task from an active state back into a waiting state (e.g. as recorded in the state data 314 associated with the scheduled task 312 or by moving the scheduled task between queues). The scheduled task is switched into a waiting state which may be referred to as a 'PIP waiting state'. This waiting state may be considered to be similar to the 'pipeline full' or 'waiting for pipeline X' state described above with reference to FIGS. 3-5, where in this example X identifies the PIP. However, there is a difference in the mechanism which causes a scheduled task to be placed into this state, because in the method shown in FIG. 4, it is the number of instructions sent to the ALU pipeline that is monitored and limited, whereas in this method shown in FIG. 7, it is the number of scheduled tasks that can send instructions to a particular ALU that is monitored and limited.

The second scheduler 608 monitors the fullness of the PIP running list 622 (blocks 718-720). In various examples, the instruction controller 620 communicates the current number of scheduled task in the PIP running list 622 to the scheduler 602 (e.g. the instruction controller 620 may broadcast this number) to enable the second scheduler 608 to perform the monitoring.

If the second scheduler 608 (whilst monitoring the number of entries in the PIP running list in blocks 718-720) identifies that the PIP running list is no longer full (Yes' in block 720, e.g. because the number of entries has fallen below the maximum number), the second scheduler 608 updates the state of a scheduled task that is waiting for the PIP (block 724) e.g. a scheduled task which is in the PIP waiting state. Where there is more than one scheduled task which is in the PIP waiting state, then the state of only one scheduled task is updated (in block 724) and the oldest scheduled task in the pipeline that is in the PIP waiting state is first selected (block 722) and then the state of the selected scheduled task is updated (in block 724).

The change of state of the selected scheduled task (in block 724) may switch the scheduled task from a waiting state (i.e. the PIP waiting state) to a ready state, such that the scheduled task can then be selected for execution by the second scheduler 608 (e.g. using the age-based scheduling method described above) or alternatively the scheduled task may be switched from the PIP waiting state to a 'waiting for active' state which is distinct from the 'ready' state described above into which scheduled tasks are placed initially prior to be activated for the first time by the second scheduler 608.

In order for the PIP running list 622 to go from being full to not being full, a scheduled task has to be removed from the PIP running list 622 and there are a number of different circumstances when scheduled tasks may be removed. FIG. 8 is a flow diagram that shows two different circumstances when scheduled tasks are removed from the PIP running list 622 and the method shown in FIG. 8 may be implemented by the instruction controller 620 and/or second scheduler 608. As shown in FIG. 8, when a scheduled task is de-activated for a reason other than to enter the PIP waiting state (block 802), it is determined whether the scheduled task (that has been de-activated) is in the PIP running list 622 (block 806) and if the scheduled task is included in the PIP running list ('Yes' in block 806), it is removed from the PIP running list 622 (block 808). Similarly, if a scheduled task completes (block 804), it is determined whether the scheduled task (that has completed) is in the PIP running list 622 (block 806) and if the scheduled task is included in the PIP running list (Yes' in block 806), it is removed from the PIP running list 622 (block 808).

A further circumstance when a scheduled task may be removed from the PIP running list 622 is shown in FIG. 7. If it is determined that a decoded instruction does not target the PIP ('No' in block 706), a check may be performed to determine whether the scheduled task to which the instruction relates is in the PIP running list 622 (block 726). If the scheduled task is in the PIP running list 622 (Yes' in block 726), the scheduled task is removed from the PIP running list 622 (block 728). Irrespective of whether the scheduled task is or is not in the PIP running list, the decoded instruction is sent to the target ALU pipeline (block 408) as described above.

In the description above, the determination of whether the PIP list is full (in block 712) and the determination of whether the PIP list is not full (in block 720) uses the same criteria, i.e. whether the number of scheduled tasks included in the PIP running list 622 equals a maximum number or not. In various examples, however, a different, lower number may be used when determining whether the PIP list is not full (in block 720). This different test (in block 720, compared to block 712) may be used to provide hysteresis (i.e. such that the PIP running list 622 does not show as being not full immediately that the number of scheduled tasks in the list falls). Such hysteresis may, for example, allow a scheduled task to briefly perform some other work without its place in the PIP running list being immediately taken by another scheduled task (i.e. giving a window of time during which a scheduled task may be able to execute an instruction of indeterminate duration, and if it completes fast enough it is allowed back into the PIP running list).

Using the methods and apparatus for optimizing the scheduling of scheduled tasks within a GPU or other parallel processing unit as described above with reference to FIGS. 6-8, a proper subset of the scheduled tasks (i.e. those scheduled tasks in the PIP running list 622) are prioritized. This avoids large numbers of scheduled tasks making slow, synchronized progress such that they complete simultaneously and instead results in some scheduled tasks executing faster than others. The methods described result in the PIP being as full as possible with instructions from a limited set of scheduled tasks which improves efficiency. Using the methods described, high latency memory requests may be distributed more regularly (e.g. the number of scheduled tasks which progress at any point is reduced towards the minimum number required to keep the ALUs busy and the closer the number of scheduled tasks progressing is kept to the minimum number, the more evenly distributed the high latency request become). Additionally the power consumption is reduced through reducing the number of scheduled tasks which are re-activated (i.e. go from a waiting or ready state to an active stage) only to be de-activated virtually immediately.

Methods and apparatus for software controlled scheduling (e.g. activation, deactivation and/or reactivation) of scheduled tasks within a GPU or other parallel processing unit can be described with reference to FIGS. 9-10.

Figure 9:
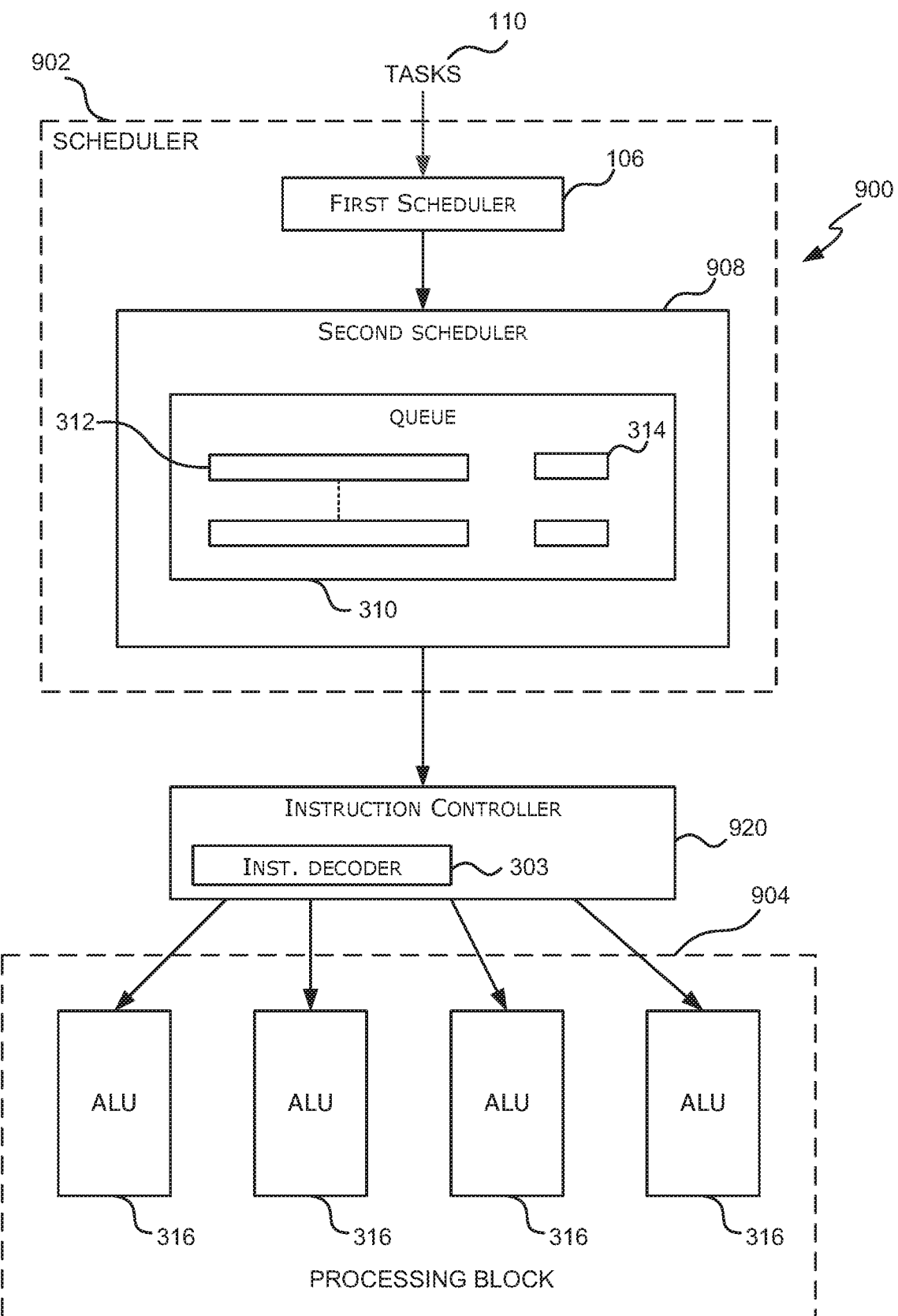
FIG. 9 is a schematic diagram of yet another example processor.

FIG. 9 is a schematic diagram showing a processor 900 which may be a GPU or other parallel processing unit. It will be appreciated that FIG. 9 only shows some elements of the processor and there may be many other elements (e.g. caches, interfaces, etc.) within the processor that are not shown in FIG. 9. The processor 900 comprises a scheduler 902, an instruction decoder 303 (which is part of an instruction controller 920) and a processing block 904.

The scheduler 902 comprises a first scheduler 106 that schedules tasks to form scheduled tasks and a second scheduler 908 that schedules (e.g activates, deactivates and/or reactivates) scheduled tasks. As described above, tasks are generally scheduled only once by the first scheduler 106; however, once a task is scheduled to form a scheduled task, the corresponding scheduled task(s) may be scheduled (e.g. activated, deactivated and/or reactivated) many times by the second scheduler 908. In particular, there may be many scheduled tasks and only a proper subset of these scheduled tasks may be active (i.e. running and executing in the processing block 904) at any time. Consequently scheduled tasks may be activated and de-activated (e.g. by being placed into one or more Waiting states' where they are not active) many times before a task is completed. The second scheduler 908 comprises one or more queues 310 which store scheduled tasks 312 (which have the required resources and their dependencies met). In various examples the second scheduler 908 comprises a single queue 310 and this queue 310 also stores state data 314 for each of the stored scheduled tasks 312 (such that the state data 314 for a scheduled tasks 312 may be described as being associated with a scheduled task 312) and the state data 314 for a scheduled task 312 identifies the current state that the scheduled task 312 is in, e.g. whether it is in an active, ready or waiting state and where there are multiple waiting states, which particular waiting state it is currently in. In other examples, the second scheduler 908 comprises multiple queues, each queue corresponding to a different state and storing scheduled tasks that are in the particular state (e.g. a 'ready' queue, an 'active' queue and one or more 'waiting' queues).

The processing block 904 comprises hardware logic for executing the instructions within scheduled tasks that are activated for execution by the scheduler 902. The processing block 904 therefore comprises a plurality of ALU pipelines 316 and the ALU pipelines may be grouped in any way. The processing block 904 may comprise different types of ALU pipelines 316, e.g. with each type of ALU pipeline being optimized for a particular type of computation. In examples where the processor 900 is a GPU, the processing block 904 may comprise a plurality of shader cores, with each shader core comprising one or more ALU pipelines 316. In various examples, the processing block 904 may be a single-instruction multi-data (SIMD) processor (which may in various examples it may be referred to as a Unified Shading Cluster (USC)) or a single-instruction single-data (SISD) processor.

The instruction controller 920 comprises one or more instruction decoders 303.

As shown in FIG. 9, the scheduler 902 receives tasks 110 and the first scheduler 106 selectively schedules these tasks 110 for execution by the processing unit 904. The scheduled tasks 312 are stored in a queue 310 by the second scheduler 908 and then scheduled (e.g. activated, deactivated and/or reactivated) by the second scheduler 908. When a scheduled task 312 is activated by the second scheduler 908, its state changes from a not active state (e.g. a ready state) to an active state and it is sent to the instruction controller 920.

The instruction controller 920 receives active (i.e. activated) scheduled tasks from the second scheduler 908 and decodes instructions associated with the active scheduled tasks using the instruction decoder 303. The instruction controller 920 then sends the decoded instructions to the targeted ALU pipeline 316 (i.e. to the ALU pipeline 316 which can execute the instruction). Each instruction has an associated swap flag (which may be set by software) and this flag controls whether the active scheduled task to which the instruction relates is de-activated or not. Operation of the swap flags and the instruction controller 920 are described in more detail below.

Figure 10:
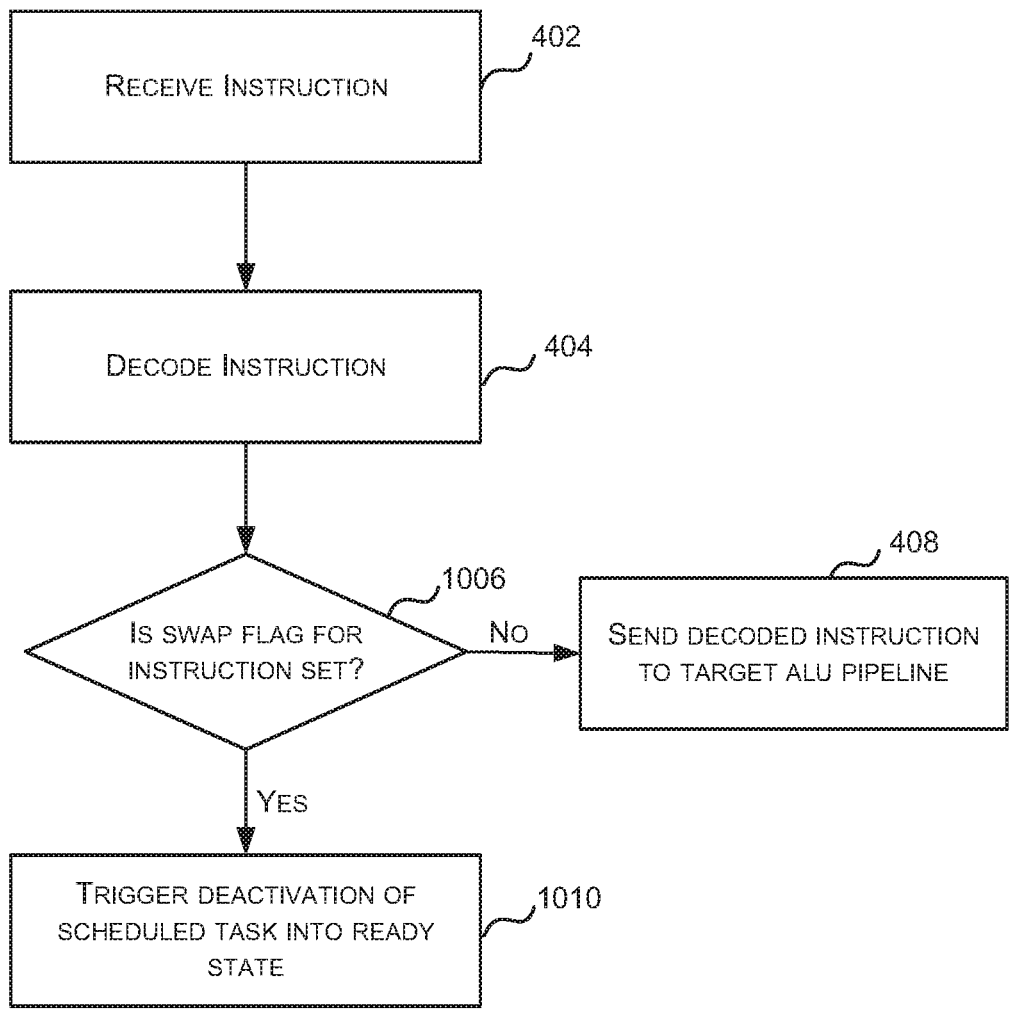
FIG. 10 is a flow diagram of yet another example method of scheduling scheduled tasks within a processor.

FIG. 10 is a flow diagram of an example method of scheduling scheduled tasks within a GPU or other parallel processing unit which enables software controlled scheduling. As shown in FIG. 9, the second scheduler 908 activates scheduled tasks and sends instructions from activated scheduled tasks to be decoded by the instruction controller 920 and then executed by ALU pipelines 316 within the processing block 904. As shown in FIG. 10, in response to receiving an instruction for decoding (block 402), the instruction controller 920 decodes the instruction (block 404, in the instruction decoder 303) and then checks whether the swap flag in the decoded instruction is set (block 1006).

If it is determined (by the instruction controller 920) that the swap flag is not set ('No' in block 1006), then the decoded instruction is sent to the target ALU pipeline 316 (block 408). If, however, it is determined (by the instruction controller 920) that the swap flag in the decoded instruction is set (Yes' in block 1006), then the instruction controller 920 triggers the de-activation of the scheduled task (block 1010) and the decoded instruction is discarded. The de-activation is performed by the second scheduler 908 (e.g. in response to a message received from the instruction controller 920) and comprises switching the scheduled task from an active state back into the ready state (e.g. as recorded in the state data 314 associated with the scheduled task 312 or by moving the scheduled task from an active queue into a ready queue).

Once a scheduled task is de-activated and is in the ready state, it can be activated again by the second scheduler 908 (e.g. using the age-based scheduling method described above). On being de-activated, the scheduled task goes to the back of the age-based queue 310 (i.e. the de-activated scheduled task becomes the newest scheduled task in the queue 310).

The use of a swap flag as described with reference to FIGS. 9 and 10 enables software (which specifies whether a swap flag is set or not for an instruction) to control the activation of scheduled tasks. This may, for example, be used to implement an alternative method of optimizing the scheduling of scheduled tasks within a GPU or other parallel processing unit by prioritizing a subset (i.e. a proper subset) of the scheduled tasks to that shown in FIGS. 6-8 and described above. This may, for example, be implemented in software which sets swap flags by setting the swap flag on the first instruction that does not target the PIP (after a set of PIP instructions). This has the effect that following the last of the instructions that targets the PIP, the scheduled task is de-activated and goes to the back of the queue 310. In various examples, through use of the swap flag, removal of a scheduled task from the PIP running list 622 when a single instruction in a sequence of instructions that otherwise targets the PIP does not target the PIP can be prevented. For example, in a sequence of instructions (for a scheduled task) which target the following ALU pipelines: PIP, PIP, PIP, PIP, non-PIP, PIP . . . , and where the non-PIP instruction (i.e. the instruction which does not target the PIP) is a simple instruction which does not take very long to execute on an ALU pipeline which is not the PIP, the swap flag may not be set for this instruction. This has the effect that the scheduled task is not de-activated and can immediately revert to executing instructions on the PIP.

Use of the swap flag, in addition to any other scheduling method, provides additional flexibility and allows some software control over the scheduling of instructions. It may also reduce the area of hardware that is required (e.g. by enabling hardware as described above with reference to FIGS. 6-8 to be omitted whilst still providing the same functionality). Furthermore, by reducing the number of scheduled tasks that are reactivated (i.e. go from a waiting or ready state to an active stage) only to be de-activated virtually immediately, the methods described above with reference to FIG. 10 may also reduce the overall power consumption of the apparatus.

Whilst the methods shown in FIGS. 2, 4 and 5, 7 and 8, and 10 are described separately above, any two or more of the methods may be used in combination (e.g. the methods described above with reference to FIGS. 2, 4, 5, 7 and 8 may be implemented together and without the method described above with reference to FIG. 10) and as described above, the method of FIG. 10 may be used to implement the method described with reference to FIGS. 7 and 8.

Figure 11:
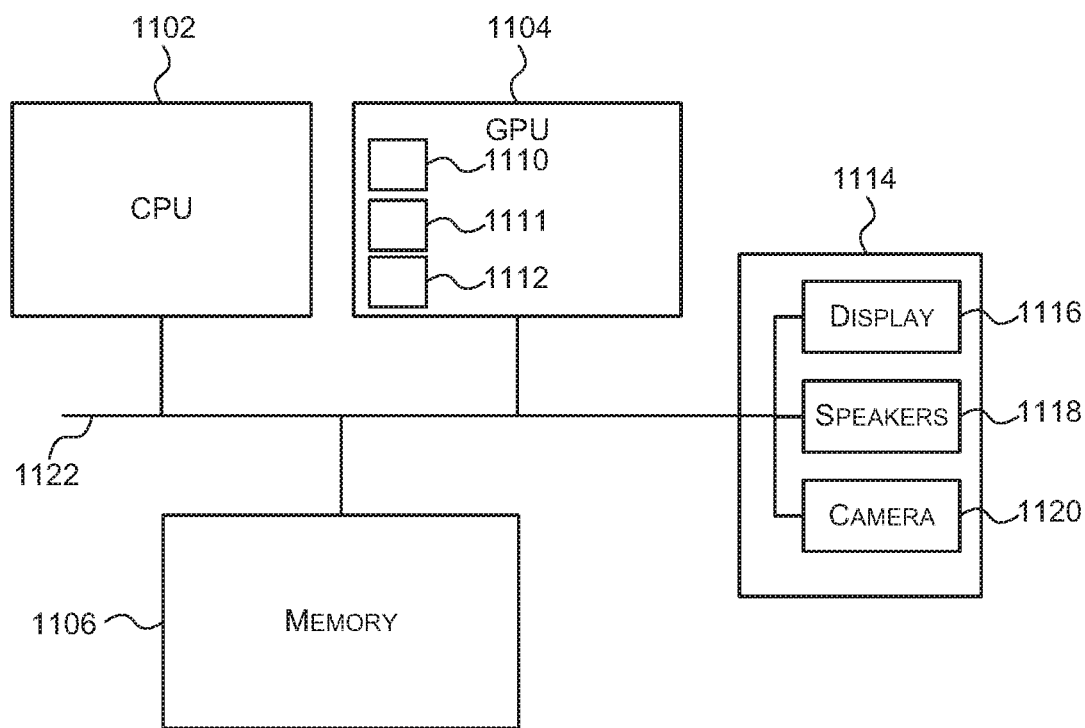
FIG. 11 shows a computer system in which an instruction controller and/or scheduled task scheduler as described herein are implemented.

FIG. 11 shows a computer system in which the instruction controller and/or second scheduler described herein described herein may be implemented. The computer system comprises a CPU 1102, a GPU 1104, a memory 1106 and other devices 1114, such as a display 1116, speakers 1118 and a camera 1120. A scheduler 1110, instruction controller/decoder 1111 and processing block 1112 (corresponding to the schedulers, instruction controllers/decoders and processing blocks shown in any of FIGS. 1, 3, 6 and 9) are shown implemented within the GPU 1104. In other examples, the scheduler 1110, instruction controller/decoder 1111 and processing block 1112 may be implemented within the CPU 1102. The components of the computer system can communicate with each other via a communications bus 1122.

The processors of FIGS. 1, 3, 6 and 9 are shown as comprising a number of functional blocks. This is schematic only and is not intended to define a strict division between different logic elements of such entities. Each functional block may be provided in any suitable manner. It is to be understood that intermediate values described herein as being formed by any element within a processor need not be physically generated by the particular element at any point and may merely represent logical values which conveniently describe the processing performed by the processor between its input and output.

The instruction controller and/or scheduled task scheduler described herein may be embodied in hardware on an integrated circuit. The instruction controller and/or scheduled task scheduler described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, byte-code, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture an instruction controller and/or scheduled tasks scheduler configured to perform any of the methods described herein, or to manufacture a processor comprising any apparatus described herein. An integrated circuit definition dataset may be, for example, an integrated circuit description.

Therefore, there may be provided a method of manufacturing, at an integrated circuit manufacturing system, an instruction controller and/or scheduled task scheduler as described herein or a processor comprising an instruction controller and/or scheduled task scheduler as described herein. Furthermore, there may be provided an integrated circuit definition dataset that, when processed in an integrated circuit manufacturing system, causes the method of manufacturing an instruction controller and/or scheduled task scheduler as described herein or a processor comprising an instruction controller and/or scheduled task scheduler as described herein to be performed.

An integrated circuit definition dataset may be in the form of computer code, for example as a netlist, code for configuring a programmable chip, as a hardware description language defining an integrated circuit at any level, including as register transfer level (RTL) code, as high-level circuit representations such as Verilog or VHDL, and as low-level circuit representations such as OASIS (RTM) and GDSII. Higher level representations which logically define an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture an instruction controller and/or scheduled task scheduler as described herein or a processor comprising an instruction controller and/or scheduled task scheduler as described herein will now be described with respect to FIG. 12.

Figure 12:
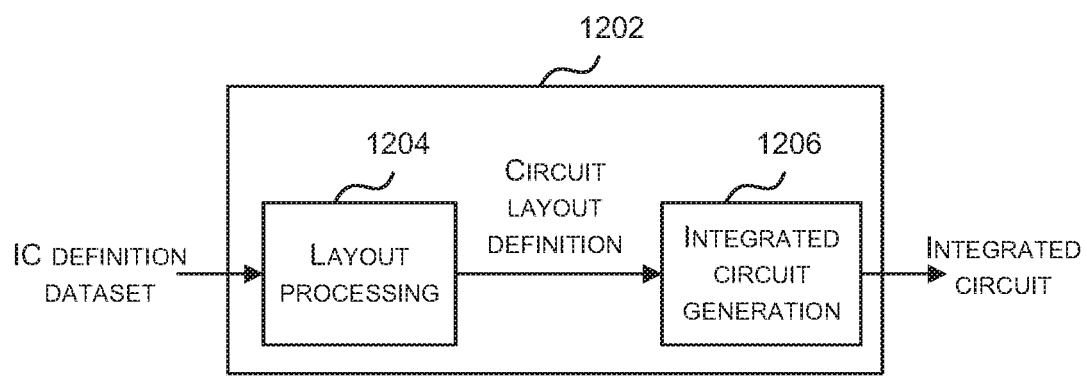
FIG. 12 shows an integrated circuit manufacturing system for generating an integrated circuit embodying an instruction controller and/or scheduled task scheduler as described herein.

FIG. 12 shows an example of an integrated circuit (IC) manufacturing system 1202 which is configured to manufacture an instruction controller and/or scheduled task scheduler as described herein or a processor comprising an instruction controller and/or scheduled task scheduler as described in any of the examples herein. In particular, the IC manufacturing system 1202 comprises a layout processing system 1204 and an integrated circuit generation system 1206. The IC manufacturing system 1202 is configured to receive an IC definition dataset (e.g. defining an instruction controller and/or scheduled task scheduler as described in any of the examples herein), process the IC definition dataset, and generate an IC according to the IC definition dataset (e.g. which embodies an instruction controller and/or scheduled task scheduler as described in any of the examples herein). The processing of the IC definition dataset configures the IC manufacturing system 1202 to manufacture an integrated circuit embodying an instruction controller and/or scheduled task scheduler as described in any of the examples herein.

The layout processing system 1204 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1204 has determined the circuit layout it may output a circuit layout definition to the IC generation system 1206. A circuit layout definition may be, for example, a circuit layout description.

The IC generation system 1206 generates an IC according to the circuit layout definition, as is known in the art. For example, the IC generation system 1006 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1206 may be in the form of computer-readable code which the IC generation system 1006 can use to form a suitable mask for use in generating an IC.

The different processes performed by the IC manufacturing system 1202 may be implemented all in one location, e.g. by one party. Alternatively, the IC manufacturing system 1202 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture an instruction controller and/or scheduled task scheduler as described herein without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 12 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 12, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The methods described herein may be performed by a computer configured with software in machine readable form stored on a tangible storage medium e.g. in the form of a computer program comprising computer readable program code for configuring a computer to perform the constituent portions of described methods or in the form of a computer program comprising computer program code means adapted to perform all the steps of any of the methods described herein when the program is run on a computer and where the computer program may be embodied on a computer readable storage medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously.

The hardware components described herein may be generated by a non-transitory computer readable storage medium having encoded thereon computer readable program code.

Memories storing machine executable data for use in implementing disclosed aspects can be non-transitory media. Non-transitory media can be volatile or non-volatile. Examples of volatile non-transitory media include semiconductor-based memory, such as SRAM or DRAM. Examples of technologies that can be used to implement non-volatile memory include optical and magnetic memory technologies, flash memory, phase change memory, resistive RAM.

A particular reference to "logic" refers to structure that performs a function or functions. An example of logic includes circuitry that is arranged to perform those function(s). For example, such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnect, by way of example. Such elements may be provided as custom circuits or standard cell libraries, macros, or at other levels of abstraction. Such elements may be interconnected in a specific arrangement. Logic may include circuitry that is fixed function and circuitry can be programmed to perform a function or functions; such programming may be provided from a firmware or software update or control mechanism. Logic identified to perform one function may also include logic that implements a constituent function or sub-process. In an example, hardware logic has circuitry that implements a fixed function operation, or operations, state machine or process.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method blocks or elements identified, but that such blocks or elements do not comprise an exclusive list and an apparatus may contain additional blocks or elements and a method may contain additional operations or elements. Furthermore, the blocks, elements and operations are themselves not impliedly closed.

The steps of the methods described herein may be carried out in any suitable order, or simultaneously where appropriate. The arrows between boxes in the figures show one example sequence of method steps but are not intended to exclude other sequences or the performance of multiple steps in parallel. Additionally, individual blocks may be deleted from any of the methods without departing from the spirit and scope of the subject matter described herein. Aspects of any of the examples described above may be combined with aspects of any of the other examples described to form further examples without losing the effect sought. Where elements of the figures are shown connected by arrows, it will be appreciated that these arrows show just one example flow of communications (including data and control messages) between elements. The flow between elements may be in either direction or in both directions.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

The invention claimed is:

1. A method of scheduling instructions within a parallel processing unit comprising:
   decoding, in an instruction decoder, an instruction in a scheduled task in an active state;
   checking, by an instruction controller, if an ALU targeted by the decoded instruction is a primary instruction pipeline;
   in response to determining that the ALU targeted by the decoded instruction is a primary instruction pipeline, checking a list associated with the primary instruction pipeline to determine whether the scheduled task is already included in the list, wherein the list associated with the primary instruction pipeline identifies scheduled tasks currently active in the primary instruction pipeline; and
   in response to determining that the scheduled task is already included in the list, sending the decoded instruction to the primary instruction pipeline.

2. The method according to claim 1, further comprising:
   in response to determining that the scheduled task is not already included in the list, determining if the list is full; and
   in response to determining that the list is full, triggering the scheduler to de-activate the scheduled task by changing the scheduled task from the active state to a waiting state;
   in response to determining that the scheduled task is not already included in the list and that the list is not full, adding the scheduled task to the list and sending the decoded instruction to the primary instruction pipeline.

3. The method according to claim 2, further comprising:
   in response to determining that the ALU targeted by the decoded instruction is not a primary instruction pipeline, checking a list associated with the primary instruction pipeline to determine whether the scheduled task is already included in the list; and
   in response to determining that the scheduled task is already included in the list, removing the scheduled task from the list and sending the decoded instruction to the ALU targeted by the decoded instruction.

4. The method according to claim 2, further comprising:
   monitoring, by the instruction controller, whether the list associated with the primary instruction pipeline is full; and
   in response to detecting, as a consequence of the monitoring, that the list has changed from being full to not being full, triggering the scheduler to re-activate an oldest scheduled task waiting for the primary instruction pipeline by removing the oldest scheduled task from the waiting state.

5. The method according to claim 2, further comprising:
   in response to detecting that a particular scheduled task has been de-activated, checking if the particular scheduled task is included in the list associated with the primary instruction pipeline and in response to determining that the particular scheduled task is included in the list, removing the particular scheduled task from the list associated with the primary instruction pipeline.

6. The method according to claim 2, further comprising:
   in response to detecting that a particular scheduled task completes, checking if the particular scheduled task is included in the list associated with the primary instruction pipeline and in response to determining that the particular scheduled task is included in the list, removing the particular scheduled task from the list associated with the primary instruction pipeline.

7. An instruction controller comprising:
   an input for receiving an instruction in a scheduled task in an active state from a scheduler;
   an instruction decoder arranged to decode the received instruction;
   a memory element arranged to store a list of scheduled tasks associated with a primary instruction pipeline in a parallel processing unit, wherein the list associated with the primary instruction pipeline identifies scheduled tasks currently active on the primary instruction pipeline; and
   hardware logic arranged to check if an ALU targeted by the decoded instruction is the primary instruction pipeline and in response to determining that the ALU targeted by the decoded instruction is a primary instruction pipeline, to check the list associated with the primary instruction pipeline to determine whether the scheduled task is already included in the list and in response to determining that the scheduled task is already included in the list, to send the decoded instruction to the primary instruction pipeline.

8. The instruction controller according to claim 7, further comprising:
   hardware logic arranged in response to determining that the scheduled task is not already included in the list, to determine if the list is full; and in response to determining that the list is full, to trigger de-activating hardware logic in the scheduler to de-activate the scheduled task by changing the scheduled task from the active state to a waiting state; and in response to determining that the scheduled task is not already included in the list and that the list is not full, to add the scheduled task to the list and send the decoded instruction to the primary instruction pipeline.

9. The instruction controller according to claim 8, further comprising:
   hardware logic arranged in response to determining that the ALU targeted by the decoded instruction is not a primary instruction pipeline, to check the list associated with the primary instruction pipeline to determine whether the scheduled task is already included in the list; and in response to determining that the scheduled task is already included in the list, remove the scheduled task from the list and send the decoded instruction to the ALU targeted by the decoded instruction.

10. The instruction controller according to claim 8, further comprising:
    hardware logic arranged to monitor whether the list associated with the primary instruction pipeline is full; and in response to detecting, as a consequence of the monitoring, that the list has changed from being full to not being full, to trigger the scheduler to re-activate an oldest scheduled task waiting for the primary instruction pipeline by removing the oldest scheduled task from the waiting state.

11. The instruction controller according to claim 8, further comprising:
    hardware logic arranged in response to detecting that a particular scheduled task has been de-activated, to check if the particular scheduled task is included in the list associated with the primary instruction pipeline and in response to determining that the particular scheduled task is included in the list, to remove the particular scheduled task from the list associated with the primary instruction pipeline.

12. The instruction controller according to claim 8, further comprising:
   hardware logic arranged in response to detecting that a particular scheduled task completes, to check if the particular scheduled task is included in the list associated with the primary instruction pipeline and in response to determining that the particular scheduled task is included in the list, to remove the particular scheduled task from the list associated with the primary instruction pipeline.

13. A non-transitory computer readable storage medium having stored thereon a computer readable description of an integrated circuit that, when processed in an integrated circuit manufacturing system, causes the integrated circuit manufacturing system to manufacture an instruction controller, the instruction controller comprising:
   an input for receiving an instruction in a scheduled task in an active state from a scheduler;
   an instruction decoder arranged to decode the received instruction;
   a memory element arranged to store a list of scheduled tasks associated with a primary instruction pipeline in a parallel processing unit, wherein the list associated with the primary instruction pipeline identifies scheduled tasks currently active on the primary instruction pipeline; and
   hardware logic arranged to check if an ALU targeted by the decoded instruction is the primary instruction pipeline and in response to determining that the ALU targeted by the decoded instruction is a primary instruction pipeline, to check the list associated with the primary instruction pipeline to determine whether the scheduled task is already included in the list and in response to determining that the scheduled task is already included in the list, to send the decoded instruction to the primary instruction pipeline.

* * * * *